(12) United States Patent
Seto et al.

(10) Patent No.: US 8,997,838 B2
(45) Date of Patent: Apr. 7, 2015

(54) VEHICULAR AIR CONDITIONING APPARATUS

(75) Inventors: Takahiro Seto, Utsunomiya (JP); Junichi Kanemaru, Columbus, OH (US); Shinji Kakizaki, Dublin, OH (US)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 1042 days.

(21) Appl. No.: 12/500,697

(22) Filed: Jul. 10, 2009

(65) Prior Publication Data

US 2011/0005711 A1    Jan. 13, 2011

(51) Int. Cl.
*B60H 1/00* (2006.01)

(52) U.S. Cl.
CPC ........ *B60H 1/00678* (2013.01); *B60H 1/00064* (2013.01); *B60H 2001/00099* (2013.01); *B60H 2001/00135* (2013.01); *B60H 2001/002* (2013.01); *B60H 2001/00635* (2013.01)

(58) Field of Classification Search
CPC .......... B60H 1/00028; B60H 1/00328; B60H 1/00278; B60H 2001/00928; B60K 11/04
USPC ........ 165/41, 42, 43, 204, 203; 454/121, 126, 454/127, 156, 160, 161; 237/12.3 A, 12.3 B
See application file for complete search history.

(56) References Cited

U.S. PATENT DOCUMENTS

| | | | |
|---|---|---|---|
| 4,559,994 A * | 12/1985 | Waldmann et al. ............. | 165/41 |
| 4,848,450 A * | 7/1989 | Lapkowsky ..................... | 165/76 |
| 5,309,731 A | 5/1994 | Nonoyama et al. | |
| 5,390,728 A * | 2/1995 | Ban ............................... | 165/204 |
| 6,101,828 A * | 8/2000 | Shikata et al. ................... | 62/244 |
| 6,308,770 B1 * | 10/2001 | Shikata et al. ................... | 165/42 |
| 6,311,763 B1 * | 11/2001 | Uemura et al. .................. | 165/43 |
| 6,422,309 B2 * | 7/2002 | Vincent ......................... | 165/204 |
| 6,640,890 B1 * | 11/2003 | Dage et al. ..................... | 165/203 |
| 6,789,607 B1 * | 9/2004 | Jun et al. ......................... | 165/43 |
| 6,796,368 B1 * | 9/2004 | Okumura et al. ................ | 165/43 |
| 7,228,689 B2 * | 6/2007 | Kadle et al. ..................... | 62/115 |
| 8,474,513 B2 * | 7/2013 | Koukouravas et al. ......... | 165/42 |
| 2004/0093885 A1 * | 5/2004 | Ito et al. .......................... | 62/244 |
| 2007/0023180 A1 * | 2/2007 | Komarek et al. ............. | 165/202 |
| 2007/0144724 A1 * | 6/2007 | Shirota et al. ................. | 165/202 |

FOREIGN PATENT DOCUMENTS

| | | |
|---|---|---|
| JP | 05-178068 | 7/1993 |
| JP | 06-040236 | 2/1994 |
| JP | 06-191257 | 7/1994 |
| JP | 10297255 A * | 11/1998 |
| JP | 2003231410 A * | 8/2003 |
| JP | 2008149866 A * | 7/2008 |

* cited by examiner

*Primary Examiner* — John Ford
(74) *Attorney, Agent, or Firm* — Rankin, Hill & Clark LLP

(57) ABSTRACT

In a vehicular air conditioning apparatus, a pair of covers are provided on the respective sides of the casing that is constituted by respective air passages. The covers rotatably support a pivot shaft for a defroster damper and a pivot shaft for a sub-defroster damper. The sub-defroster damper is disposed in a passage directly connecting the heater core with the defroster blow-out port, and is disposed on an upstream side of the defroster damper. First and second blower units supply air into the casing. The sub-defroster damper is disposed so as to face a passage which is disposed even inside the casing. Thus, the flowing direction and the amount of air is adjusted.

19 Claims, 31 Drawing Sheets

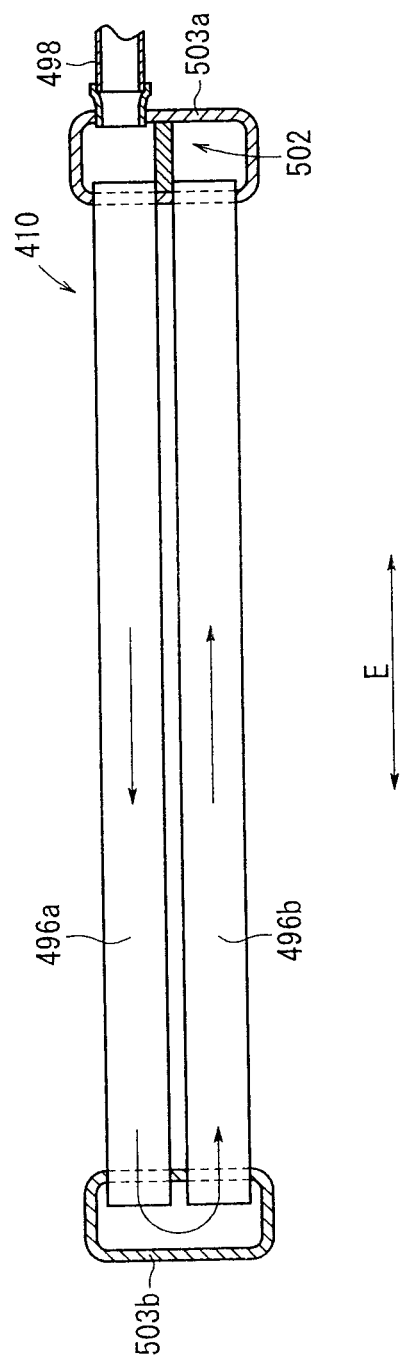

VEHICULAR AIR CONDITIONING APPARATUS

BACKGROUND OF THE INVENTION

1. Field of the Invention

The present invention relates to a vehicular air conditioning apparatus mounted in a vehicle for blowing air into a vehicle compartment that has been adjusted in temperature by a cooling means or a heating means, for thereby adjusting temperature of the vehicle compartment.

2. Description of the Related Art

In a vehicular air conditioning apparatus that is mounted in a vehicle, internal and external air is introduced into a casing by a blower, and after cooled air, which has been cooled by an evaporator that forms a cooling means, and heated air, which has been heated by a heater core that forms a heating means, are mixed together in the casing at a predetermined mixing ratio, the mixed air is blown out from a defroster blow-out port, a face blow-out port, or a foot blow-out port, whereby adjustment of temperature and humidity in the vehicle compartment is carried out.

With this type of vehicular air conditioning apparatus, for example, it is known to provide a first blower for the purpose of introducing vehicle compartment air into the casing, and a second blower for the purpose of introducing external air outside of the vehicle compartment into the casing. In such a vehicular air conditioning apparatus, air that is introduced from an internal air introduction port by rotation of the first blower is heated by a first heat exchanger and then is blown into the vehicle compartment through a first air passage from the face blow-out port or the foot blow-out port. In addition, air that is introduced from an external air introduction port by rotation of the second blower is heated by a second heat exchanger and then is blown into the vehicle compartment through a second air passage from the defroster blow-out port. More specifically, a switching operation is performed such that when air is blown out from the face blow-out port or the foot blow-out port, the first blower is driven and air from the interior of the vehicle is introduced, whereas when air is blown out from the defroster blow-out port, the second blower is rotated and external air is introduced.

Further, using separate air conditioning devices having first and second blowers for introducing air, the first blower is arranged facing toward an external air introducing port of a duct, and the second blower is arranged facing toward an interior air introducing port. Additionally, the first blower includes a switching means, which is capable of switching the air that is introduced to the duct by the first blower between interior air and exterior air. In addition, the air that is introduced to the duct by the first blower is switched between interior air and exterior air by the switching means, and after the air has been adjusted in temperature by a heating means and a cooling means so as to provide a desired temperature together with the air introduced to the duct by the second blower, the air is blown into a desired region in the vehicle compartment through a face blow-out port, a foot blow-out port, or a defroster blow-out port. (See, for example, Japanese Laid-Open Patent Publication No. 05-178068, Japanese Laid-Open Patent Publication No. 06-040236, and Japanese Laid-Open Patent Publication No. 06-191257.)

When air, which is separately adjusted in temperature, is blown to the respective seats of the passengers as in the vehicular air conditioning apparatus disclosed in Japanese Laid-Open Patent Publication No. 05-178068, Japanese Laid-Open Patent Publication No. 06-040236, and Japanese Laid-Open Patent Publication No. 06-191257, the passages for flowing air in the air conditioning apparatus need to have a complicated structure. Further, it is necessary to provide dampers in the passages for opening/closing or changing the flowing direction of air in the passages. For the passages in the casing, however, it is impossible to form rotatable dampers integrally, by resin molding, metal casting or the like.

Also, in the vehicular air conditioning apparatus, it is not easy to carry out maintenance and management of air passages or components therein, since the apparatus itself comprises an integrally-formed casing and thus the apparatus has a complicated structure. In particular, maintenance and management of the dampers are difficult due to frequent rotation thereof, which perform strict temperature control all the time.

SUMMARY OF THE INVENTION

A general object of the present invention is to provide a vehicular air conditioning apparatus, which can be easily assembled, maintained and managed, by making dampers and a casing having air passages separable from each other while the dampers are rotatably provided in and detachable from an opening defined in the casing.

In order to achieve the aforementioned object, the present invention is characterized by a vehicular air conditioning apparatus including a first blower unit, a second blower unit, a casing in which passages are formed, air from the first and second blower units passing the passages, an evaporator and a heater core disposed inside the casing.

In the aforementioned casing, there are provided a defroster blow-out port that opens at an upward center portion of the casing, openings provided on respective sides of the casing, and cover members covering the openings.

In the vehicular air conditioning apparatus of the present invention, the cover members rotatably support a defroster damper that opens/closes the defroster blow-out port.

According to the present invention, even when passages for flowing air have a complicated structure in a resin or metal casing, a defroster damper, which is provided separately from the casing, can be attached through an opening. Therefore, a damper for changing the flowing direction of air can be disposed depending on the position of the opening.

Further, since the damper is freely detachable through the opening, maintenance and management of the damper itself and air passages can easily be carried out.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 23 is a cross sectional view taken along line XXIII-XXIII of FIG. 21;

DESCRIPTION OF THE PREFERRED EMBODIMENTS

Figure 1:
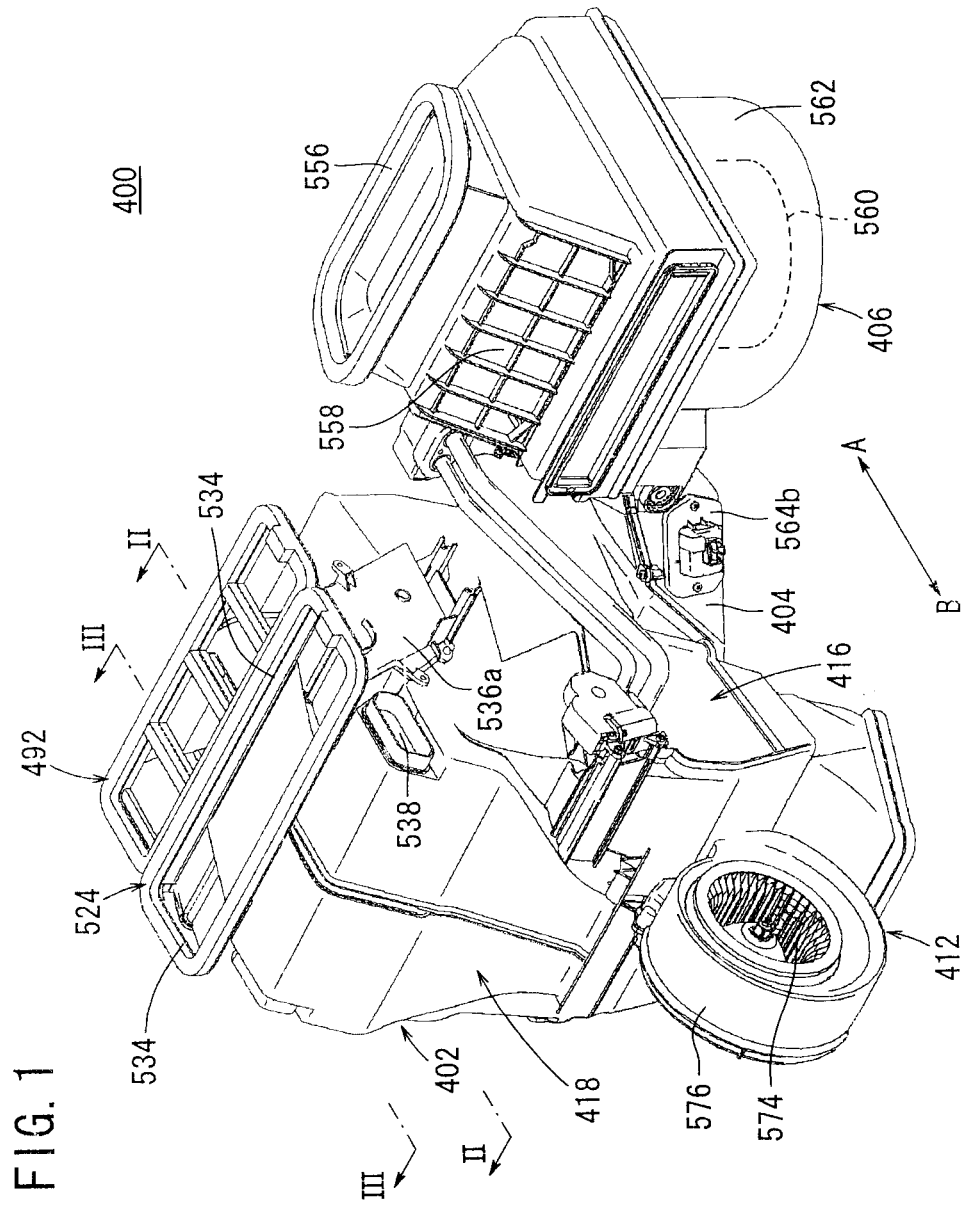
FIG. 1 is an external perspective view of a vehicular air conditioning apparatus according to an embodiment of the present invention.

A preferred embodiment of a vehicular air conditioning apparatus shall be presented and explained in detail below with reference to the accompanying drawings. In FIG. 1, reference numeral 400 indicates a vehicular air conditioning apparatus according to an embodiment of the present invention. The vehicular air conditioning apparatus 400, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
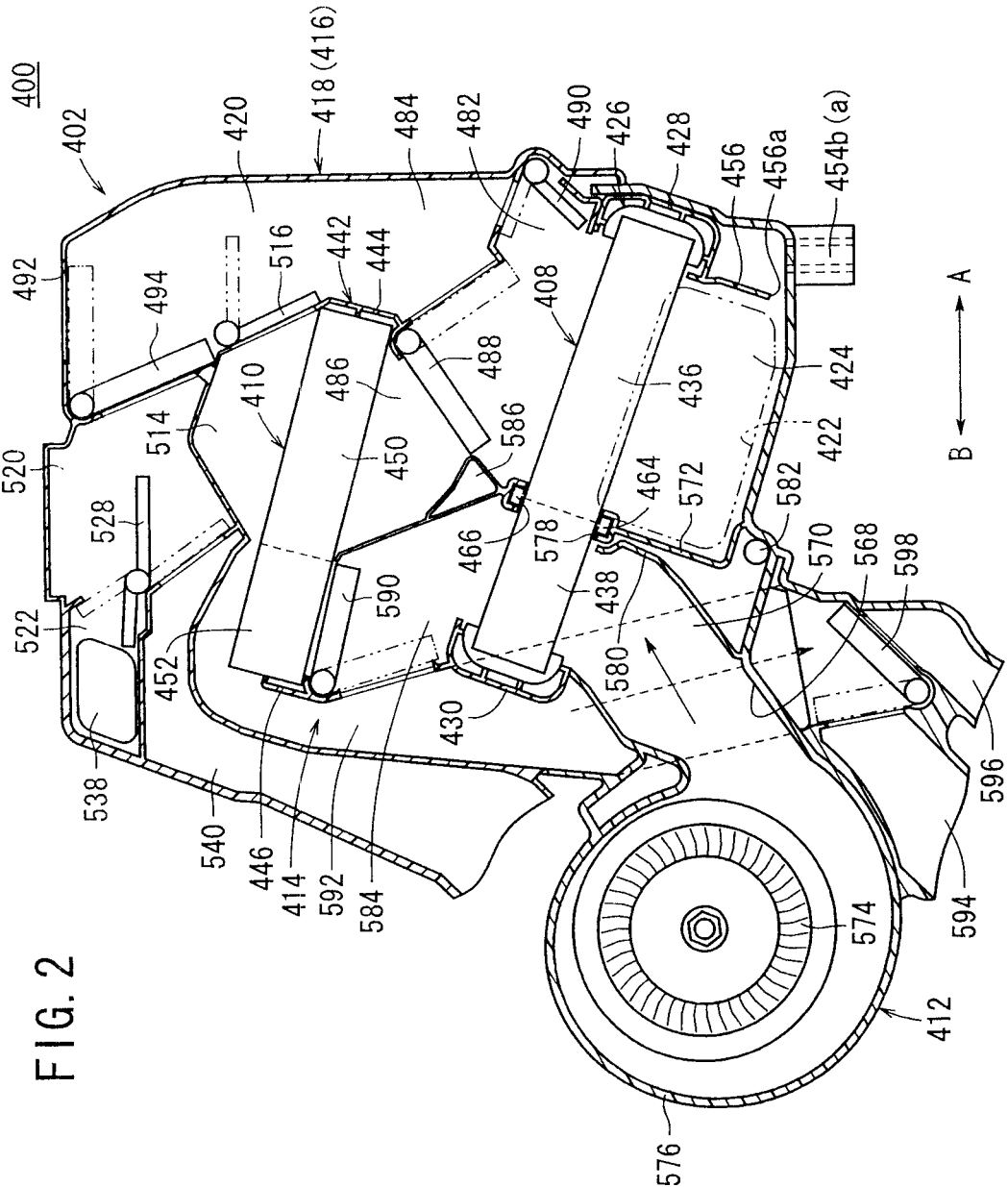
FIG. 2 is a cross sectional view taken along line II-II of FIG. 1.

Further, the vehicular air conditioning apparatus 400 is installed so that the righthand side thereof shown in FIG. 2 (in the direction of arrow A) is oriented toward the front side of the vehicle, whereas the lefthand side (in the direction of arrow B) is oriented toward the rear side of the vehicle. The arrow A direction shall be described as a forward direction, whereas the arrow B direction shall be described as a rearward direction.

Figure 3:
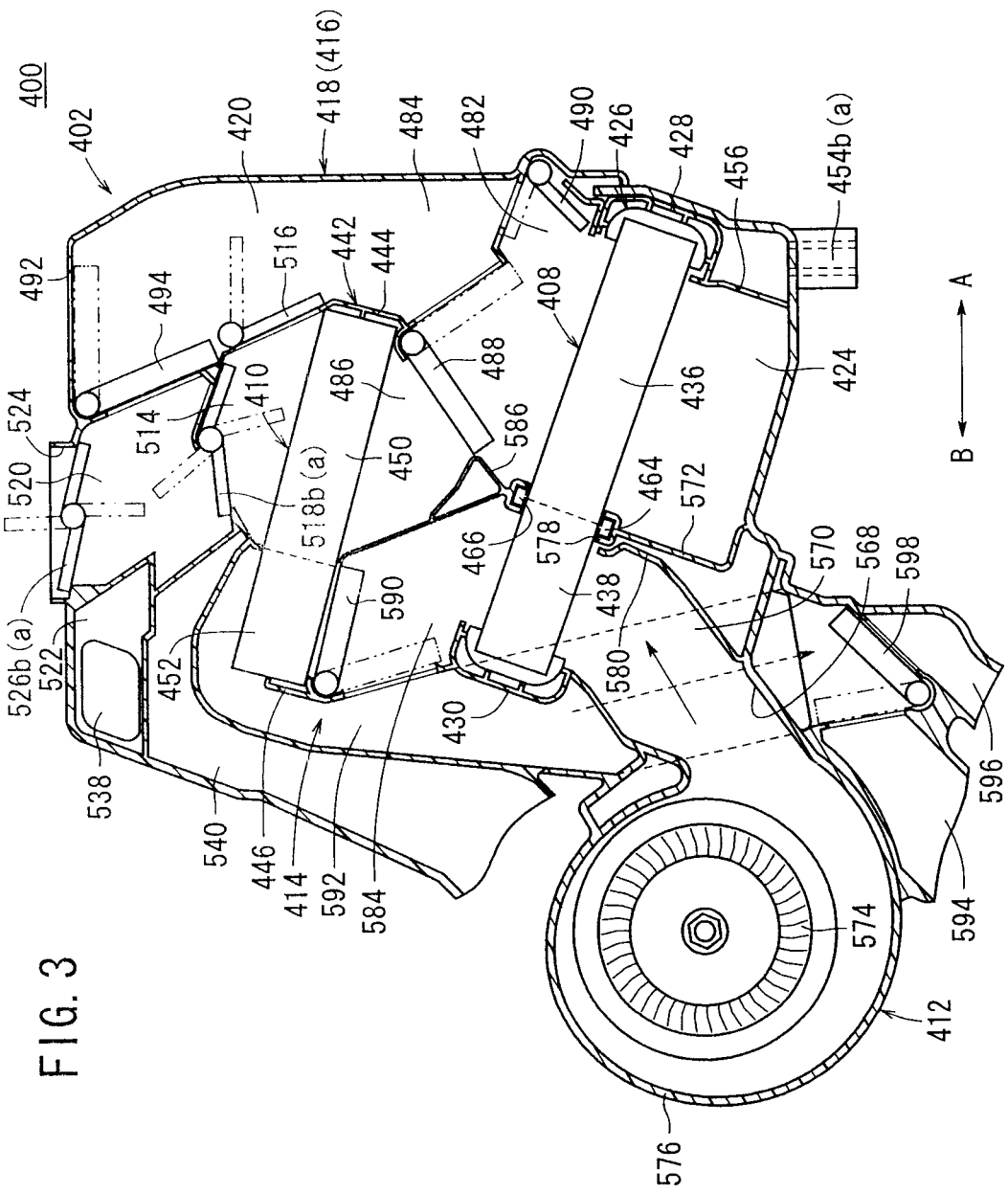
FIG. 3 is a cross sectional view taken along line III-III of FIG. 1.
Figure 4:
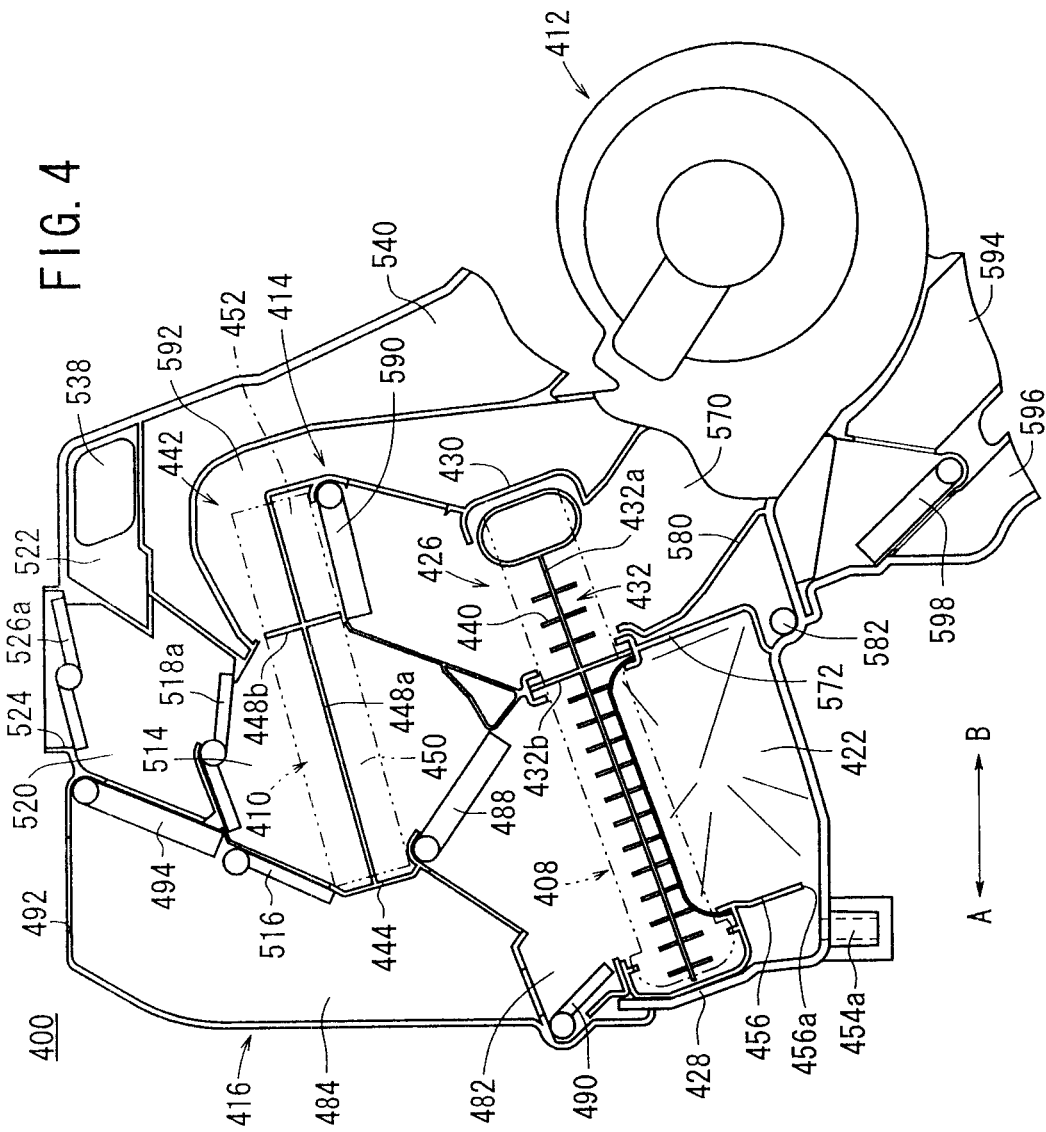
FIG. 4 is a side view of a first divided casing as seen from an interior side thereof.
Figure 5:
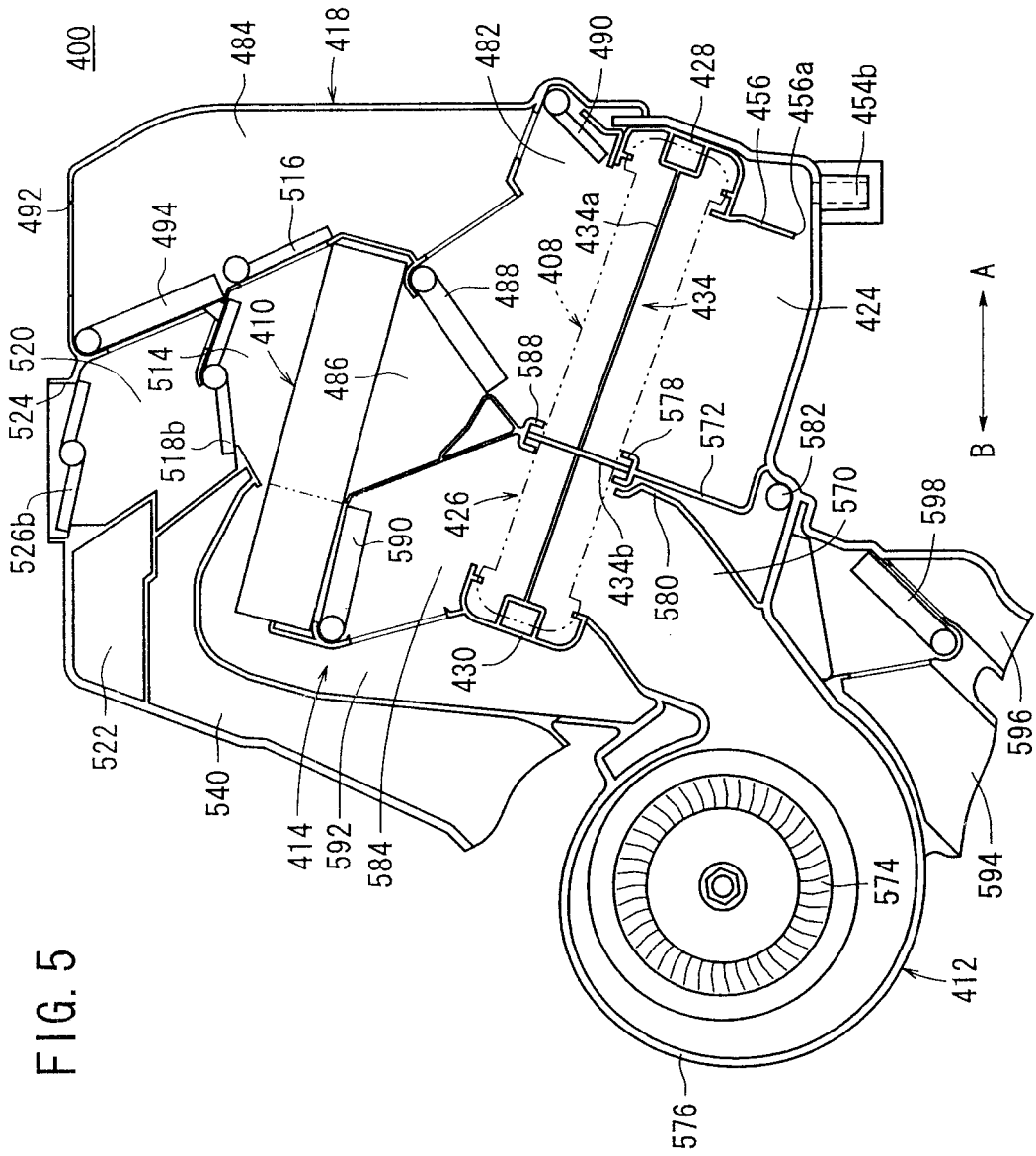
FIG. 5 is a side view of a second divided casing as seen from an interior side thereof.

Further, FIG. 2 is a cross sectional view in a central portion (taken along line II-II in FIG. 1) along the widthwise direction of the vehicular air conditioning apparatus 400, whereas FIG. 3 is a cross sectional view of a region (taken along line III-III in FIG. 1) somewhat deviated to the side of the second divided casing 418 from the aforementioned central portion.

In the embodiment of the invention discussed below, a plurality of rotating members made up of dampers or the like are disposed in the interior of the casing. Such rotating members are driven by rotary drive sources such as motors or the like. For purposes of simplification, drawings and explanations concerning such rotary drive sources have been omitted.

As shown in FIGS. 1 to 5, the vehicular air conditioning apparatus 400 includes a casing 402 constituted by respective air passages, a first blower unit 406 connected through a connection duct 404 to a side portion of the casing 402 for blowing air toward the front seat side of the vehicle, an evaporator (cooling means) 408 arranged inside the casing 402 for cooling the air, a heater core (heating means) 410 for heating the air, a second blower unit 412 connected to a lower portion of the casing 402 for blowing air toward the middle seats and rear seats of the vehicle, and a damper mechanism 414 for switching the flow of air that flows through and inside each of the respective passages.

The casing 402 is constituted by first and second divided casings 416, 418 having substantially symmetrical shapes, wherein a center plate 420 (see FIG. 27) is disposed between the first divided casing 416 and the second divided casing 418. The connection duct 404 is connected on a lower side portion of the first divided casing 416, and a first intake port 422 is formed through which air is supplied from the first blower unit 406. The first intake port 422 communicates with a first front passage (first passage) 424 disposed on an upstream side of the evaporator 408. As easily understood from FIG. 1, the second blower unit 412 expands outwardly and is disposed at a joined region of the substantially symmetrical first divided casing 416 and second divided casing 418 that make up the casing 402, more specifically, at a center portion of the casing 402. Further, the second blower unit 412 is positioned inside a non-illustrated center console of the vehicle.

As shown in FIGS. 2 to 5, in the first and second divided casings 416, 418, an evaporator holder 426 is formed for maintaining the evaporator 408, which has a rectangular shape in cross section. The evaporator holder 426 is provided on a lower part of the casing 402 facing the first intake port 422. The evaporator holder 426 includes a first retaining member 428 that holds one end of the evaporator 408 that is disposed on the forward side (in the direction of arrow A) of the casing 402, and a second retaining member 430 that holds another end of the evaporator 408 that is disposed on the rearward side (in the direction of arrow B) of the casing 402. The first and second retaining members 428, 430 are formed with U-shapes in cross section, which open toward one another in mutually facing directions, and extend in the widthwise direction of the casing 402, from an inner wall surface of the first divided casing 416 to an inner wall surface of the second divided casing 418.

Further, because the first retaining member 428 confronts the second retaining member 430 and is disposed downwardly with respect to the second retaining member 430, the evaporator 408, which is retained by the first and second retaining members 428, 430, is disposed such that one end thereof in the forward direction of the vehicle (the direction of arrow A) is inclined downward at a predetermined angle with respect to the other end thereof.

Figure 6:
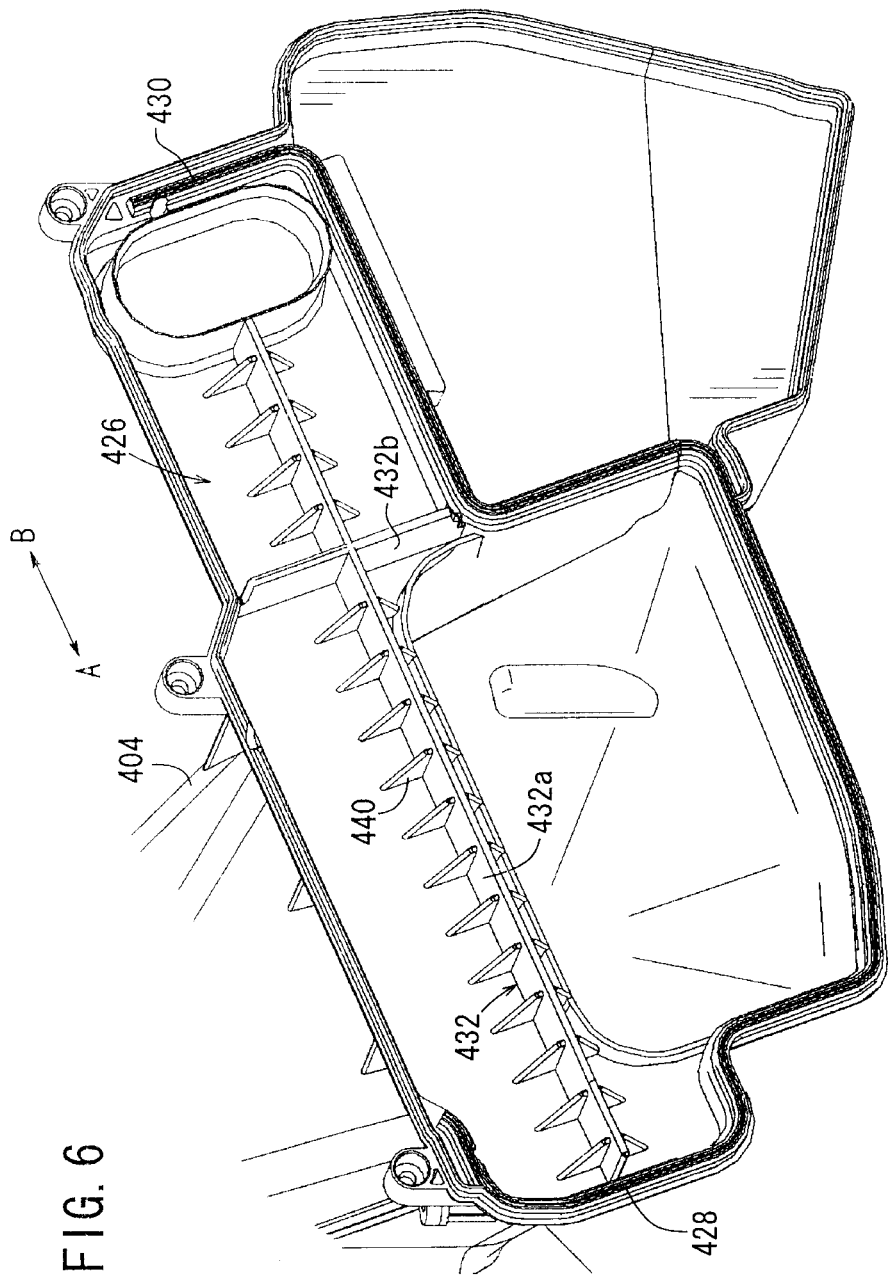
FIG. 6 is an enlarged perspective view of (an evaporator holder of) a connecting duct that fixes an evaporator connected with the first divided casing.
Figure 7:
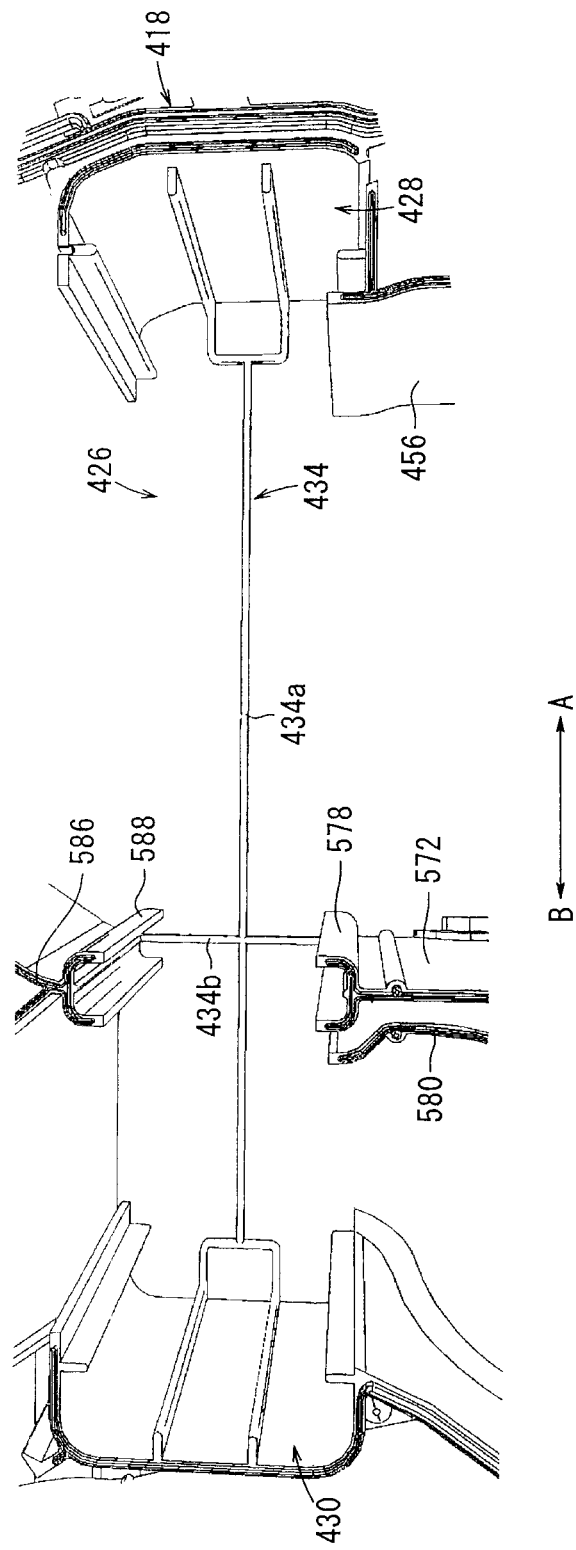
FIG. 7 is an enlarged perspective view of the evaporator holder, which is disposed on an inner wall surface of the second divided casing.

As shown in FIG. 6, a first rib (sealing means) 432, which projects a predetermined height from the inner wall surface at a position between the first retaining member 428 and the second retaining member 430, is formed on the inner wall surface of the first divided casing 416, wherein the first rib 432 abuts against one side surface of the evaporator 408. On the other hand, as shown in FIG. 7, a second rib (sealing means) 434, which projects a predetermined height from the inner wall surface of the second divided casing 418 at a position between the first retaining member 428 and the second retaining member 430, is formed on the inner wall surface thereof, confronting the first rib 432, wherein the second rib 434 abuts against the other side surface of the evaporator 408.

Figure 8:
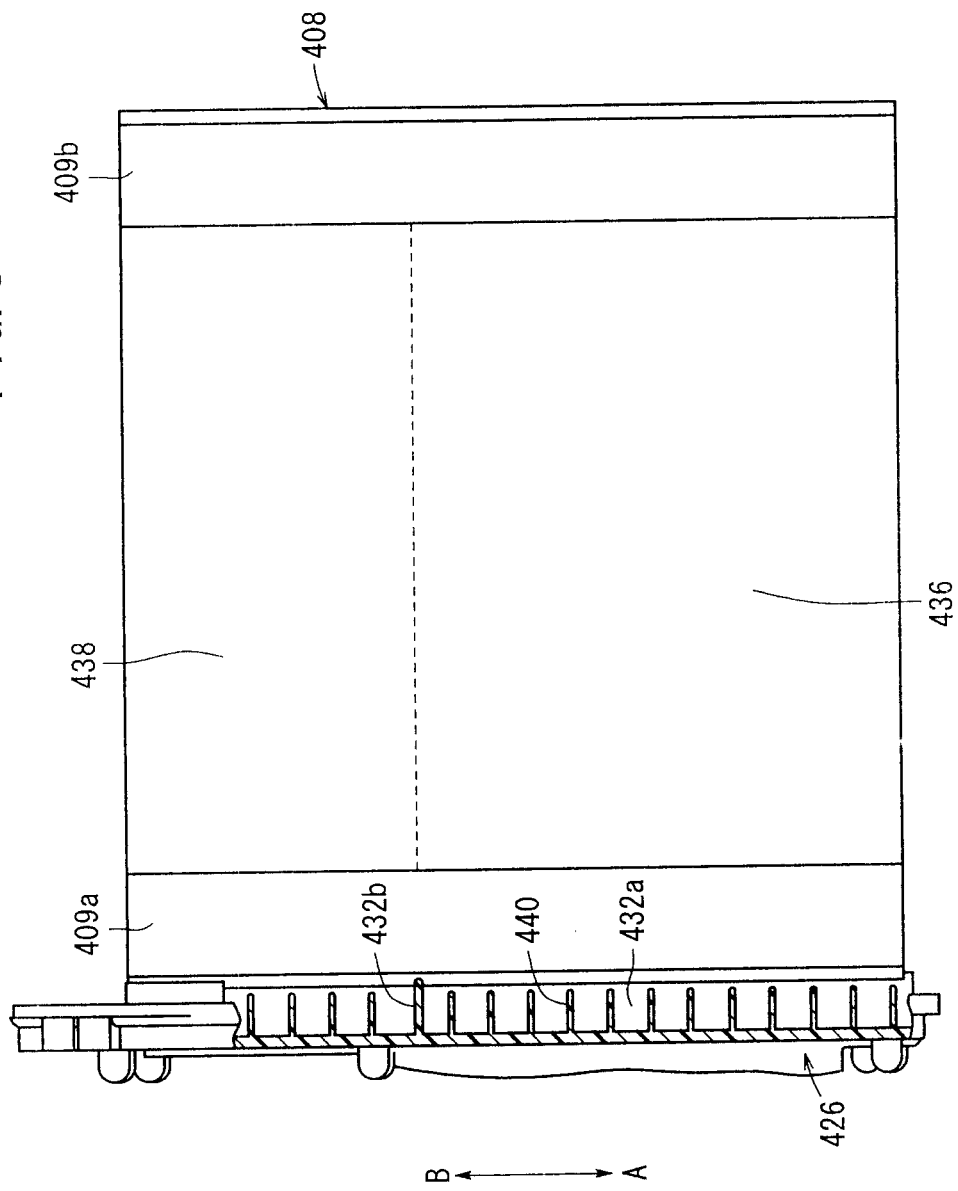
FIG. 8 is a plan view with partial omission showing an evaporator, which is retained on an inner wall surface of the first divided casing.

The first and second ribs 432, 434 are formed respectively with cross-like shapes, such that horizontal ribs 432a, 434a (second sealing portions) thereof, which extend from the first retaining member 428 to the second retaining member 430, abut roughly in the center of the evaporator 408 to divide the evaporator 408 in half in the thickness direction thereof. On the other hand, vertical ribs (first sealing portions) 432b, 434b, which are perpendicular to the horizontal ribs 432a, 434a, abut against a boundary portion in the evaporator 408 of a first cooling section 436 through which air supplied from the first blower unit 436 passes, and a second cooling section 438 through which air supplied from the second blower unit 412 passes (refer to FIG. 8). The vertical ribs 432b, 434b are disposed substantially parallel to the blowing direction of air that is supplied to the evaporator 408 from the first front passage 424 and a first rear passage 570. Stated otherwise, the horizontal ribs 432a, 434a face toward the first front passage 424 and the first rear passage 570 and are formed substantially parallel with the lower surface (supply surface) of the evaporator 408 on the upstream side thereof to which the air is supplied. Further, compared to the second rib 434, the first rib 432 is set to have a greater height from the inner wall surface of the first divided casing 416, and the horizontal rib 432a and vertical rib 432b are formed perpendicularly with respect to the inner wall surface.

More specifically, by abutment of the horizontal ribs 432a, 434a of the first and second ribs 432, 434 against side surfaces of the evaporator 408, air is prevented from flowing to the downstream side between inner wall surfaces of the first and second divided casings 416, 418 and the evaporator 408. On the other hand, by abutment of the vertical ribs 432b, 434b of the first and second ribs 432, 434 against the boundary portion of the first cooling section 436 and the second cooling section 438, air supplied from the first blower unit 406 is prevented from flowing through the side of the second cooling section 438 at times when the second blower unit 412 is halted, and conversely, air supplied from the second blower unit 412 is prevented from flowing through the side of the first cooling section 436 at times when the first blower unit 406 is halted.

Figure 9:
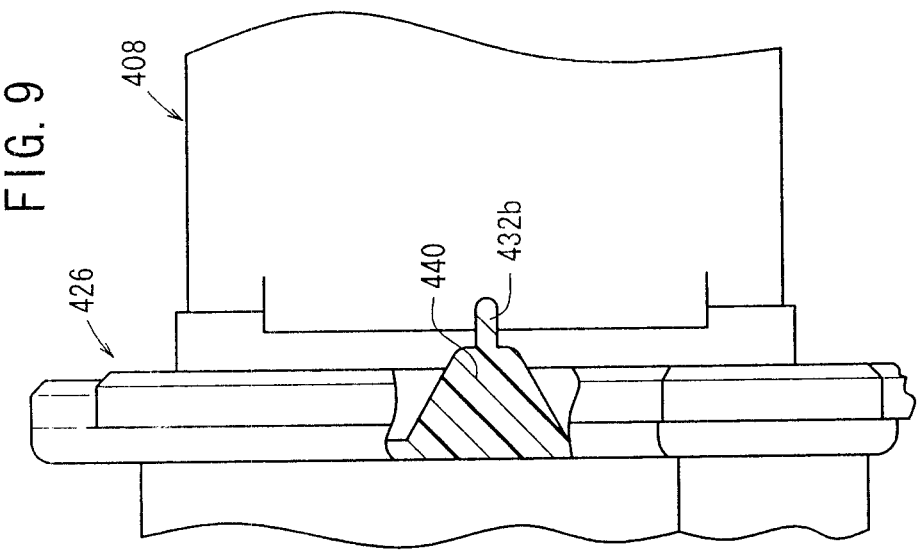
FIG. 9 is a partial enlarged side view of the evaporator of FIG. 8.

Furthermore, on the inner wall surface of the first divided casing 416, a plurality of reinforcement ribs (reinforcement members) 440 are formed substantially parallel with the vertical ribs 432b. The reinforcement ribs 440 are disposed with respect to upper and lower surface sides of the horizontal rib 432a, and are formed with substantially triangular shapes in cross section, which taper in a direction away from the inner wall surface (see FIGS. 6 and 9).

Further, as shown in FIGS. 2 and 3, on the first and second divided casings 416, 418, a heater holder 442 is formed for maintaining a heater, which has a rectangular shape in cross section. The heater holder 442 is provided upwardly of the evaporator holder 426. The heater holder 442 includes a first retaining member 444 that holds one end of the heater core 410 that is disposed on the forward side (in the direction of arrow A) of the casing 402, and a second retaining member 446 that holds another end of the heater core 410 that is disposed on the rearward side (in the direction of arrow B) of the casing 402. The first retaining member 444 is formed to cover one end portion of the heater core 410, whereas the second retaining member 446 is formed to cover a lower half part only of the other end of the heater core 410. The first and second retaining members 444, 446 extend along the widthwise direction of the casing 402, from an inner wall surface of the first divided casing 416 to an inner wall surface of the second divided casing 418.

Further, because the first retaining member 444 confronts the second retaining member 446 and is disposed downwardly with respect to the second retaining member 446, the heater core 410, which is retained by the first and second retaining members 444, 446, is disposed such that one end thereof in the forward direction of the vehicle (the direction of arrow A) is inclined downward at a predetermined angle with respect to the other end thereof.

Figure 10:
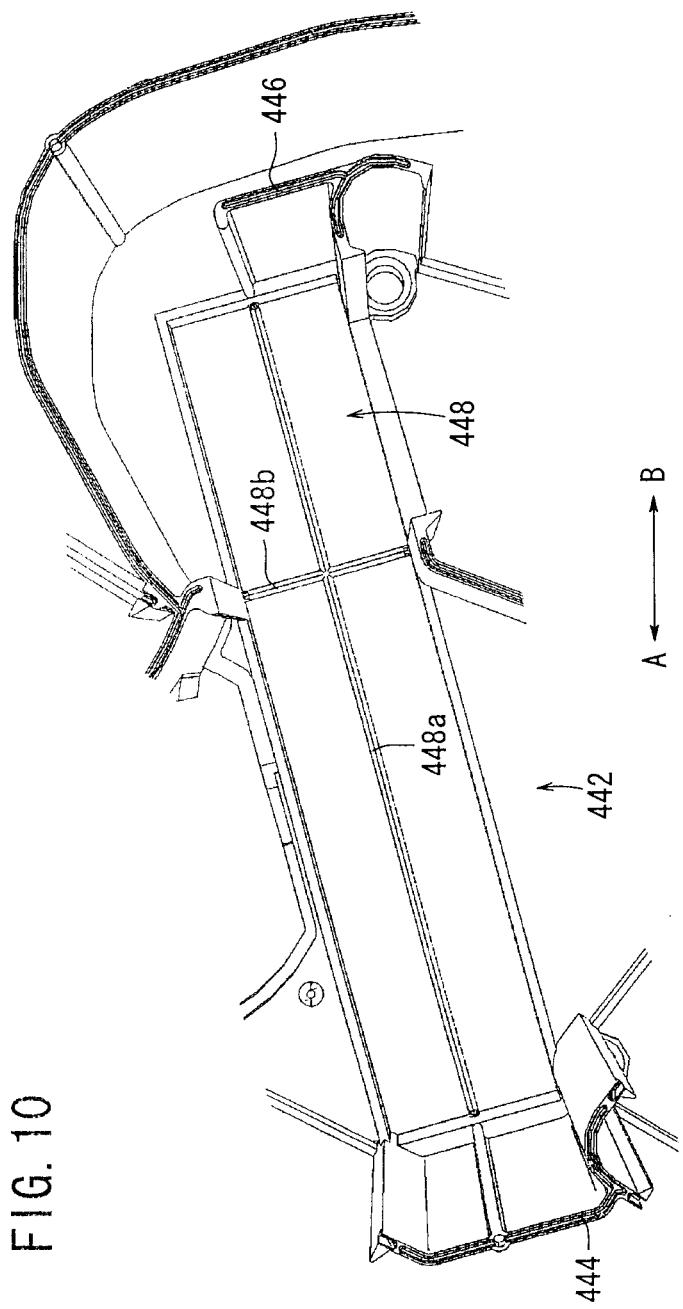
FIG. 10 is an enlarged perspective view of a heater holder disposed on an inside wall surface of the first divided casing.

Furthermore, as shown in FIG. 10, a rib 448, which projects a predetermined height from the inner wall surface at a position between the first retaining member 444 and the second retaining member 446, is formed on the inner wall surface of the first divided casing 416, such that the rib 448 abuts against one side surface of the heater core 410. The rib 448 is formed with a substantially cross-like shape, such that a horizontal rib 448a thereof, which extends from the first retaining member 444 to the second retaining member 446, abuts roughly in the center of the heater core 410 to divide the heater core 410 in half in the thickness direction thereof. On the other hand, a vertical rib 448b, which is perpendicular to the horizontal rib 448a, abuts against a boundary portion in the heater core 410 of a first heating section 450 through which air supplied from the first blower unit 406 passes, and a second heating section 452 through which air supplied from the second blower unit 412 passes (refer to FIG. 4). Further, in the second divided casing 418, a region thereof opens in a direction facing toward the heater core 410.

More specifically, by abutment of the horizontal rib 448a of the rib 448 against a side surface of the heater core 410, air is prevented from flowing to the downstream side between the inner wall surface of the first divided casing 416 and the heater core 410. At the same time, by abutment of the vertical rib 448b against the boundary portion of the first heating section 450 and the second heating section 452, air supplied from the first blower unit 406 is prevented from flowing through the side of the second heating section 452 at times when the second blower unit 412 is halted, and conversely, air supplied from the second blower unit 412 is prevented from flowing through the side of the first heating section 450 at times when the first blower unit 406 is halted.

Further, as shown in FIGS. 2 to 5, on the bottom portion of the casing 402, a first guide panel 456 is formed, which faces toward the first front passage 424 on a forward side (in the direction of arrow A) adjacent to first drain ports 454a, 454b. The first guide panel 456 is arranged in an upstanding manner along the extending direction of the first front passage 424. An upper end part thereof extends to the vicinity of the lower surface of the evaporator 408, and is bent in a direction (the direction of arrow B) separating from the evaporator holder 426 that retains the evaporator 408.

Owing thereto, in the evaporator 408, for example, although water condensation is generated when air passing through the interior of the evaporator 408 is cooled, because one end side thereof is disposed to be inclined downwardly at a predetermined angle, moisture that is generated inside the evaporator 408 can be moved to one end side, i.e., the front side of the vehicle (in the direction of arrow A), along the lower surface of the evaporator 408.

Figure 11:
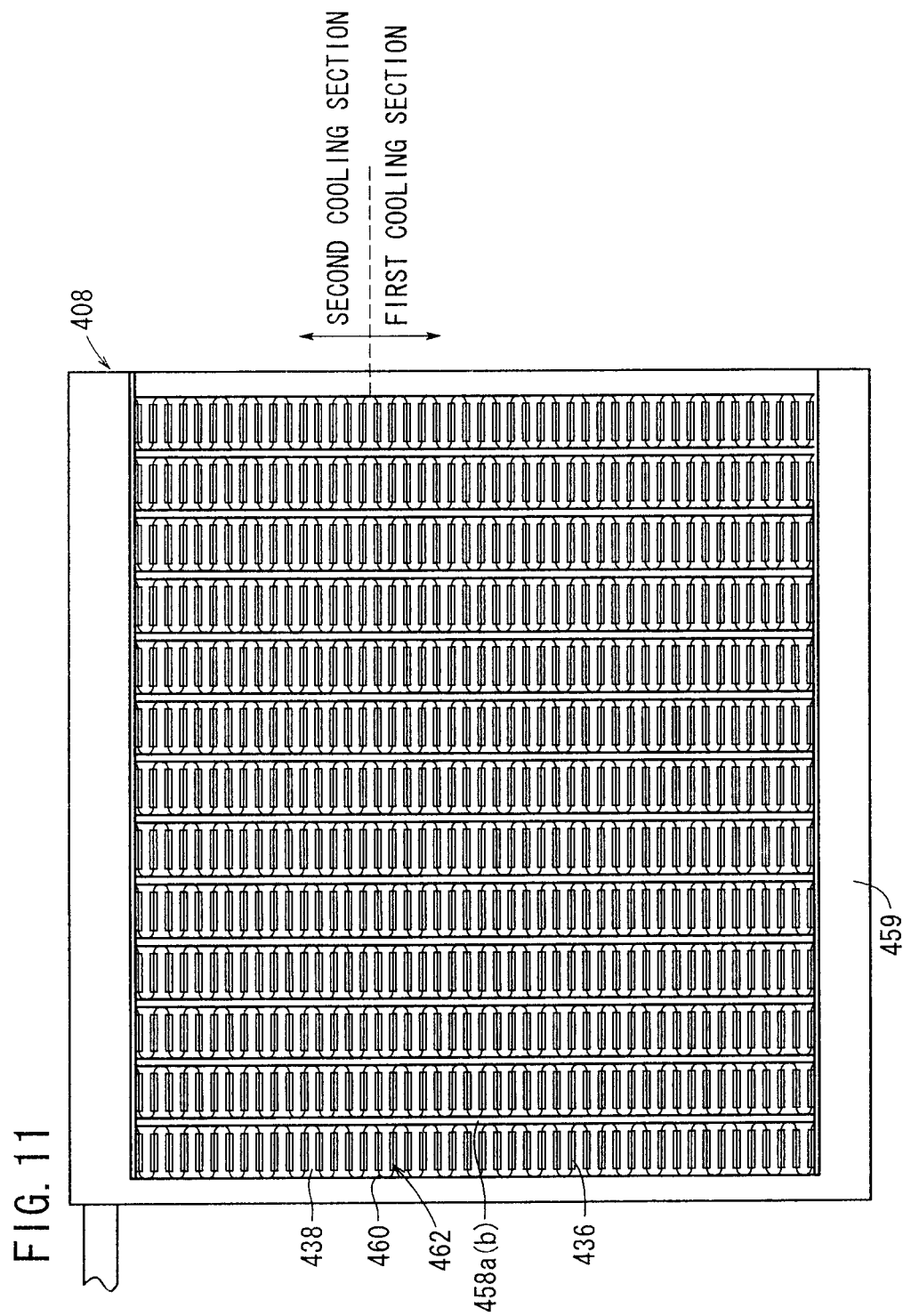
FIG. 11 is a plan view of an evaporator.

As shown in FIG. 11, in the evaporator 408, for example, tubes 458a, 458b are formed from thin plates of aluminum or the like, and fins 460, which are folded in a serpentine-like undulating shape, are disposed respectively between the stacked tubes 458a, 458b. On the fins 460, a plurality of louvers 462 are formed, which are cut out so as to be inclined at predetermined angles with respect to the planar surface of the fins 460. By causing a coolant medium to flow through the interior of the tubes 458a, 458b, air that passes through the louvers 462 and flows between the fins 460 is cooled by the coolant medium and is supplied to the downstream side as chilled air. At the evaporator 408, the paired tubes 458a, 458b are arrayed in parallel and arranged in two layers in the thickness direction of the evaporator 408.

Further, the evaporator 408 includes the first cooling section 436, which cools air supplied from the first blower unit 406, and the second cooling section 438, which cools air supplied from the second blower unit 412. Additionally, the first cooling section 436 is arranged in the forward direction (the direction of arrow A) of the casing 402, whereas the second cooling section 438 is arranged in the rearward direction (the direction of arrow B) of the casing 402.

Figure 13:
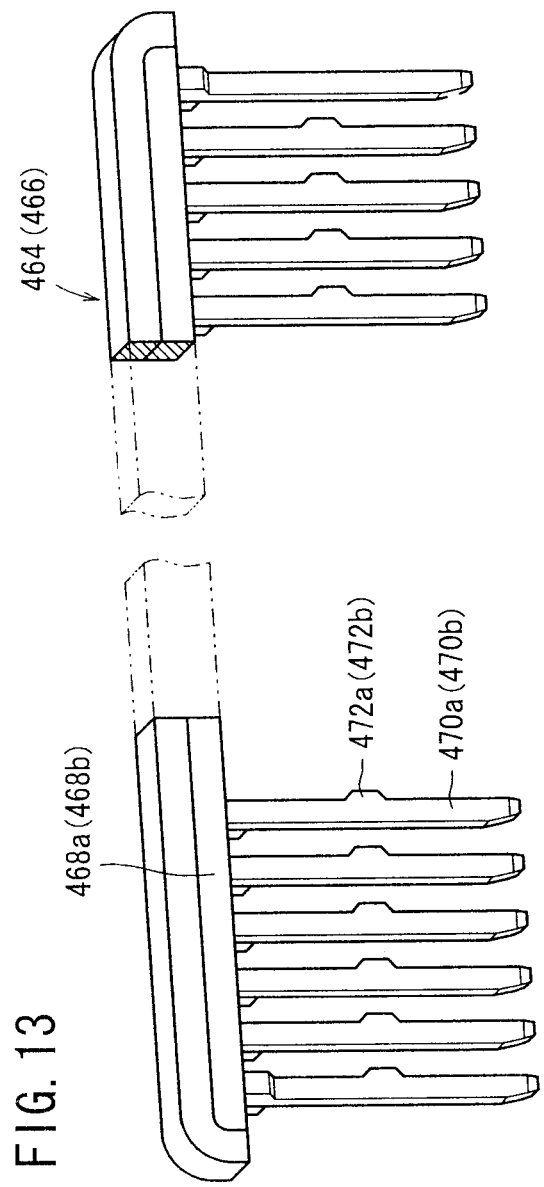
FIG. 13 is a perspective view with partial omission of the first and second partitioning members shown in FIG. 12.
Figure 14:
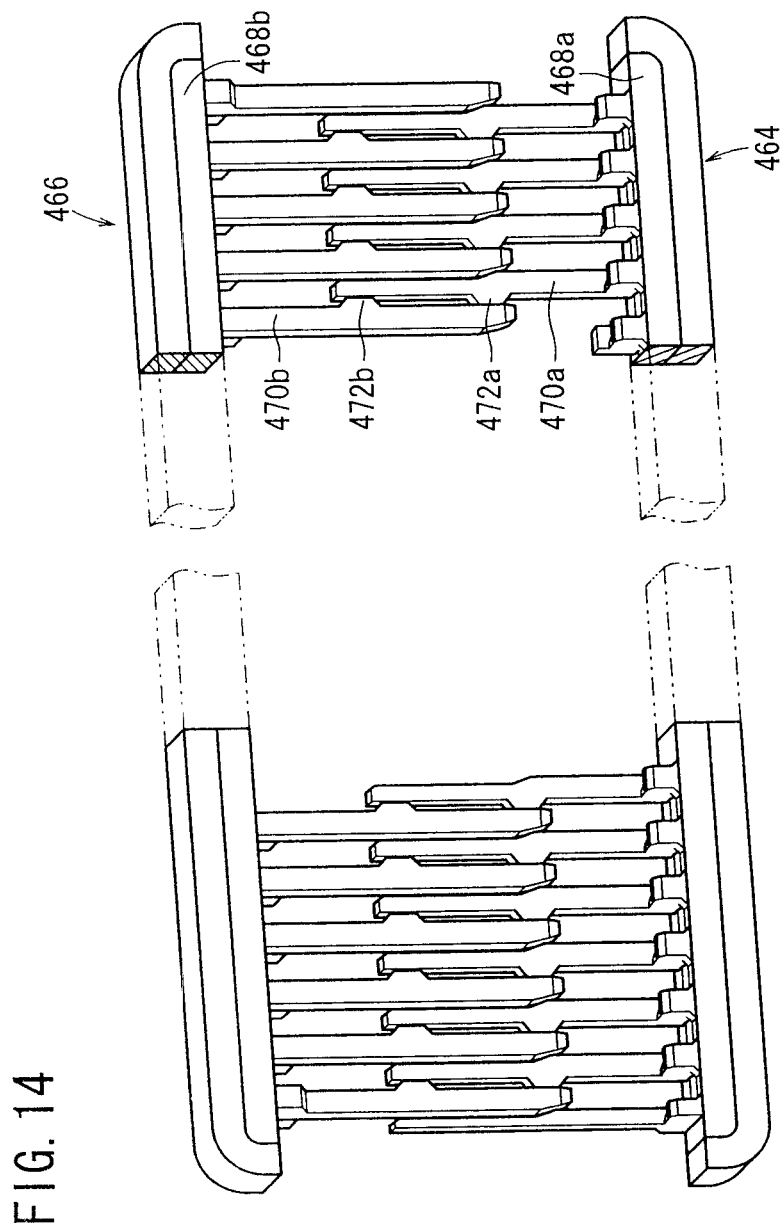
FIG. 14 is a perspective view with partial omission showing a condition during assembly of the first partitioning member and the second partitioning member.
Figure 15:
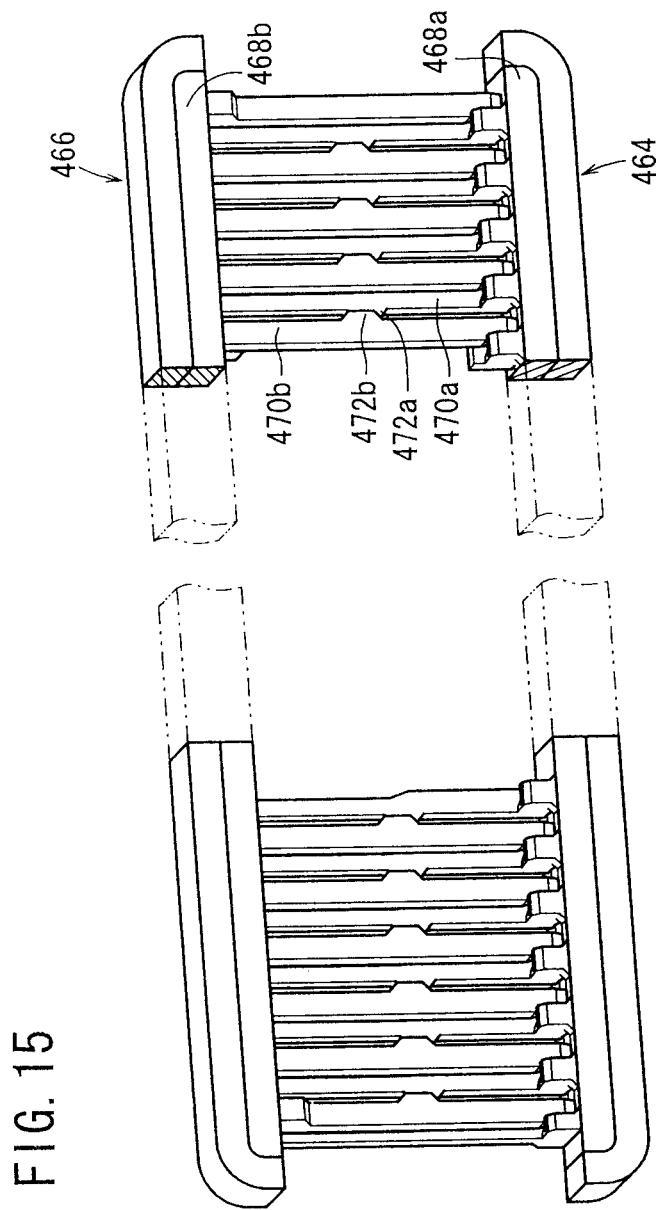
FIG. 15 is a perspective view with partial omission showing an evaporator installed state, in which the first partitioning member and the second partitioning member shown in FIG. 14 are completely assembled.
Figure 16:
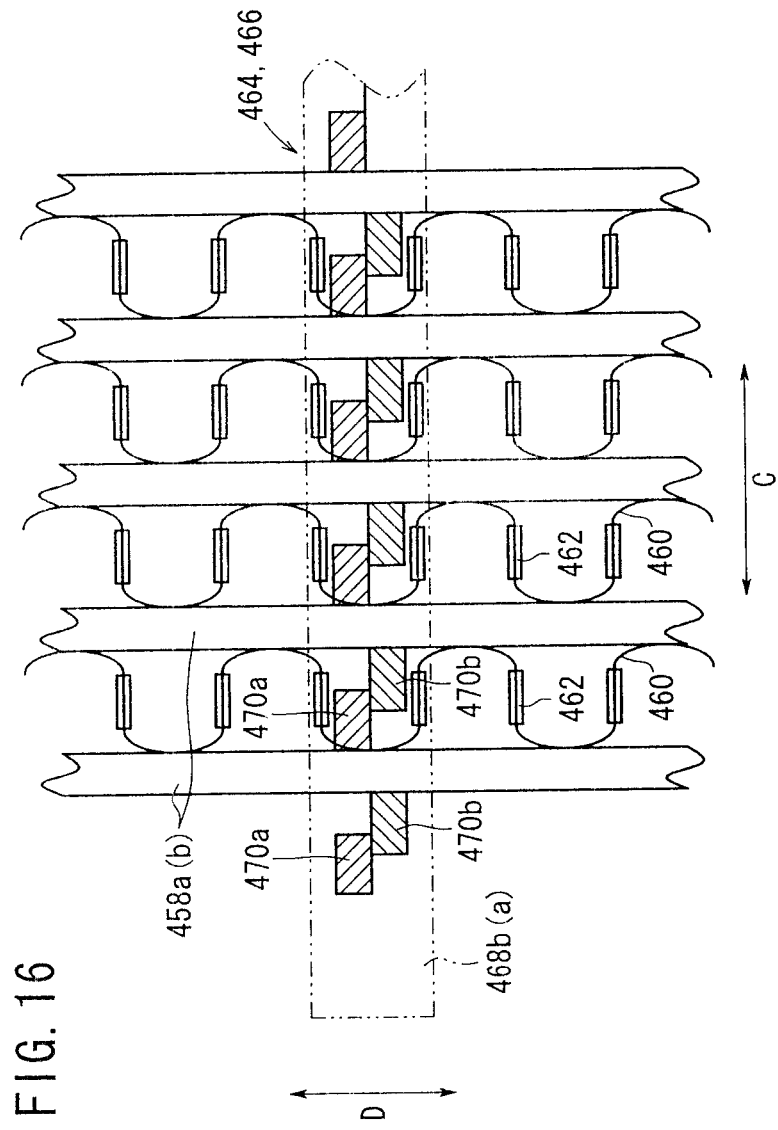
FIG. 16 is a cross sectional view with partial omission showing a condition in which a first partitioning member and a second partitioning member are installed on an evaporator.

At the boundary region between the first cooling section 436 and the second cooling section 438, as shown in FIG. 16, a pair of first and second partitioning members 464, 466 are installed for blocking communication of air between the first cooling section 436 and the second cooling section 438. As shown in FIGS. 13 to 15, the first and second partitioning members 464, 466 are formed from a resin material, for example, and are equipped with straightly formed base portions 468a, 468b, and a plurality of sealing portions 470a, 470b, which project at a predetermined length from the lower surface of the base portions 468a, 468b. Also, projections 472a, 472b are formed thereon, which project in a direction perpendicular to the lengthwise direction, centrally along the lengthwise direction of the sealing portions 470a, 470b. The sealing portions 470a, 470b are formed with the same length, and are disposed so as to be separated mutually at equal intervals along the base portions 468a, 468b. Further, the projections 472a, 472b project in the same directions with respect to the sealing portions 470a, 470b.

Figure 12:
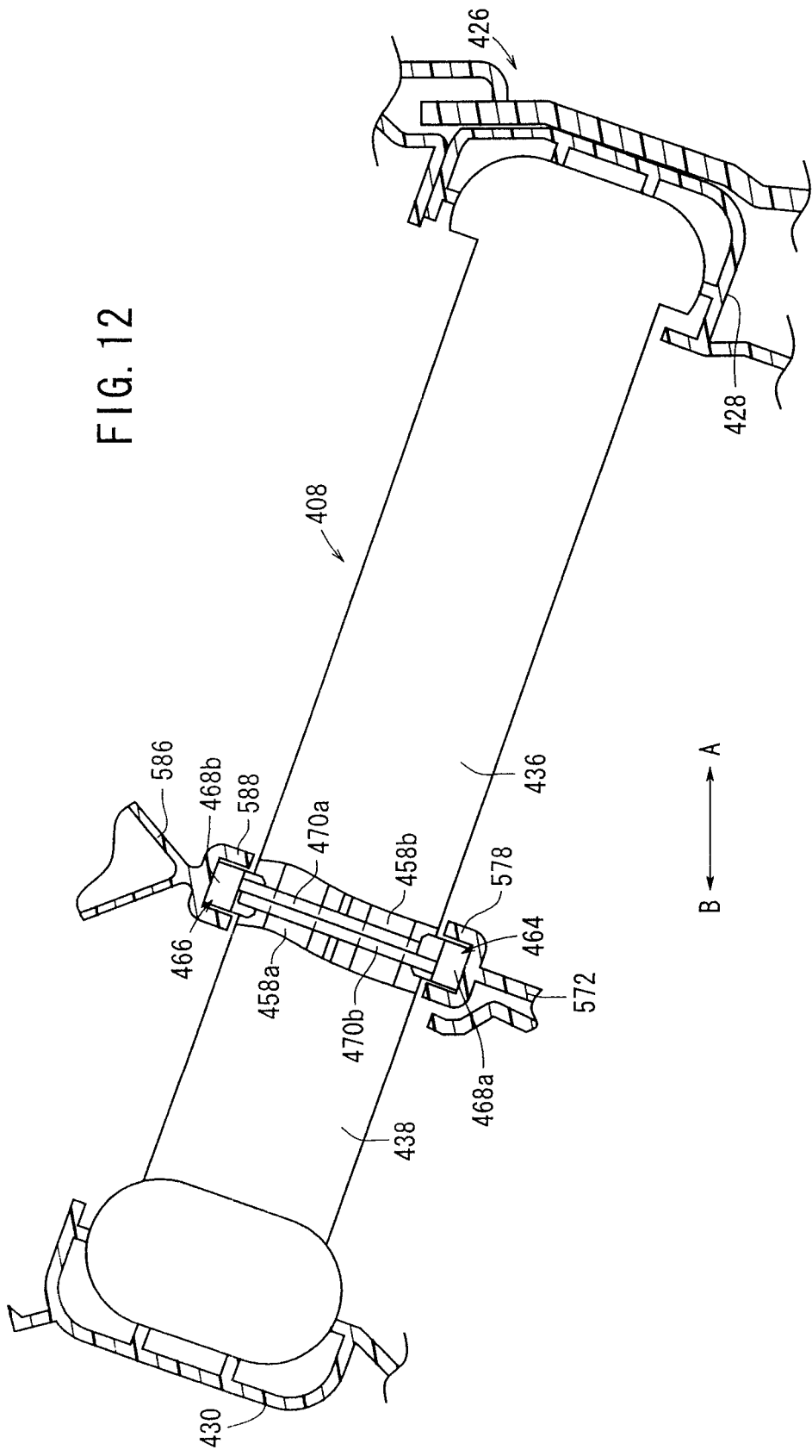
FIG. 12 is an enlarged side view showing a condition in which the evaporator of FIG. 11 is retained in an evaporator holder, and further wherein first and second partitioning members are installed thereon.

Additionally, as shown in FIG. 12, the first partitioning member 464 is mounted on a lower surface side of the evaporator 408 on the upstream side thereof, such that the sealing portions 470a thereof are inserted respectively between the stacked tubes 458a, 458b in the evaporator 408, and the base portion 468a abuts against the lower surface. On the other hand, the second partitioning member 466 is mounted on an upper surface side of the evaporator 408 on the downstream side thereof, such that the sealing portions 470b thereof are inserted on an opposite side from the first partitioning member 464 between the tubes 458a, 458b, and the base portion 468b abuts against the upper surface.

At this time, as shown in FIG. 16, the sealing portions 470a of the first partitioning member 464 and the sealing portions 470b of the second partitioning member 466 are offset from each other along the direction of extension (the direction of arrow C) of the base portions 468a, 468b, and further, overlap in the direction of extension of the tubes 458a, 458b. Owing to the two sealing portions 470a, 470b, which are mutually overlapped in this manner, intervals between adjacent tubes 458a, 458b in the same layer are sealed respectively. Next, the projections 472a of the first partitioning member 464 and the projections 472b of the second partitioning member 466 are inserted between the adjacent tubes 458a and the tubes 458b, while the first partitioning member 464 and the second partitioning member 466 are slid respectively along the direction of extension (the direction of arrow C) of the base portions 468a, 468b. Consequently, the projections 472a of the first partitioning member 464 and the projections 472b of the second partitioning member 466 overlap in the direction of extension of the tubes 458a, 458b, and gaps occurring between the tubes 458a disposed on the upper surface side and the tubes 458b disposed on the lower surface side are sealed (see FIG. 17).

Figure 17:
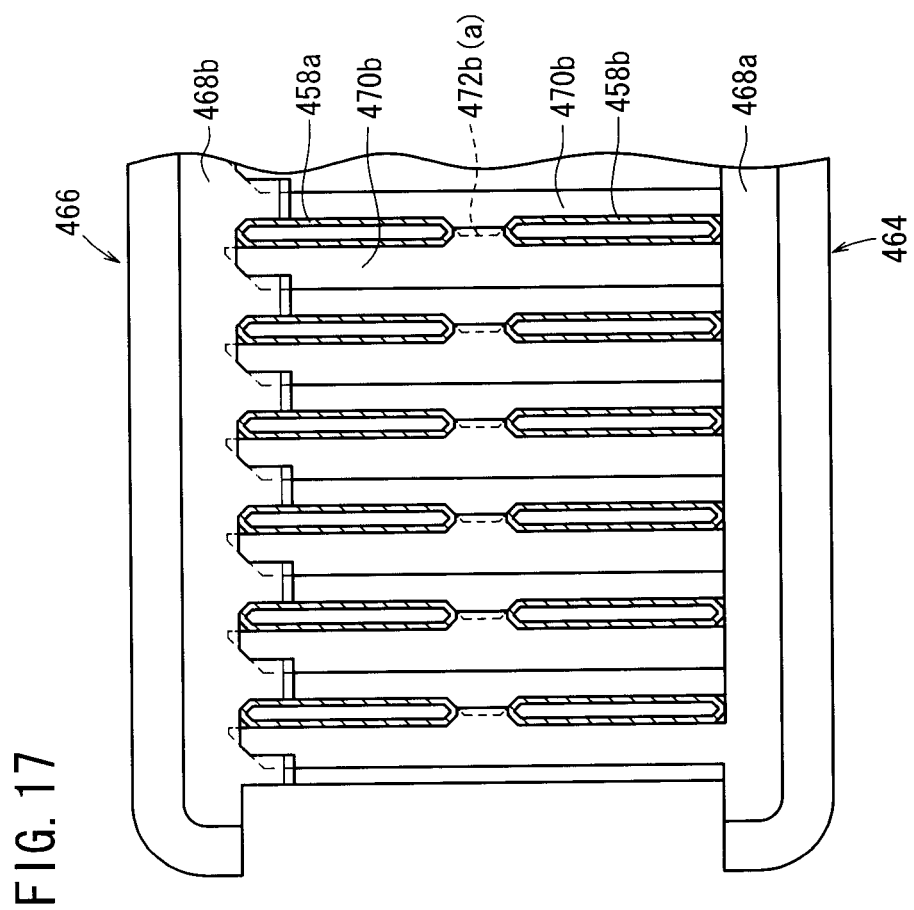
FIG. 17 is a front view, partially in cross section, showing a condition in which a first partitioning member and a second partitioning member are installed on an evaporator.

Consequently, since the flow of air between the tubes 458a, 458b, which are disposed in two layers, is blocked by the first and second partitioning members 464, 466 installed between the first cooling section 436 and the second cooling section 438, flow of air between the first cooling section 436 and the second cooling section 438 is prevented (see FIGS. 16 and 17).

Moreover, in a condition of being installed on the evaporator 408, the base portions 468a, 468b of the first and second partitioning members 464, 466 are retained respectively in base holders 578, 588, which are formed in the casing 402 (see FIG. 12).

Further, the means for blocking communication of air between the first cooling section 436 and the second cooling section 438 in the evaporator 408 is not limited to the aforementioned first and second partitioning members 464, 466. For example, as shown in FIG. 18, in place of the aforementioned first and second partitioning members 464, 466, a plate-shaped partition plate 474 may also be disposed at the boundary region between the first cooling section 436 and the second cooling section 438.

Figure 18:
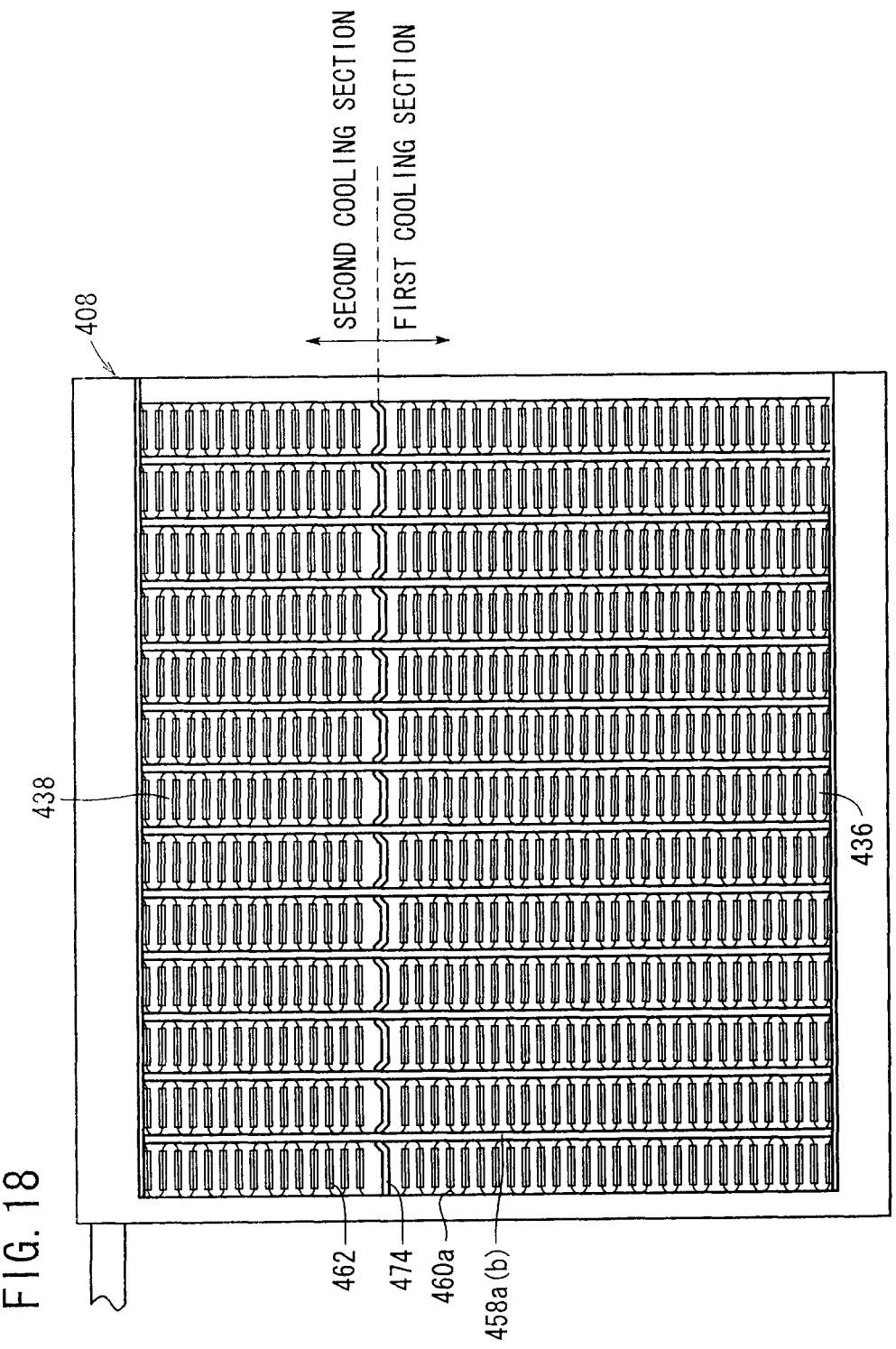
FIG. 18 is a plan view of an evaporator according to a modified example, in which a partition plate is installed thereon in place of the first and second partitioning members of FIG. 17.
Figure 19:
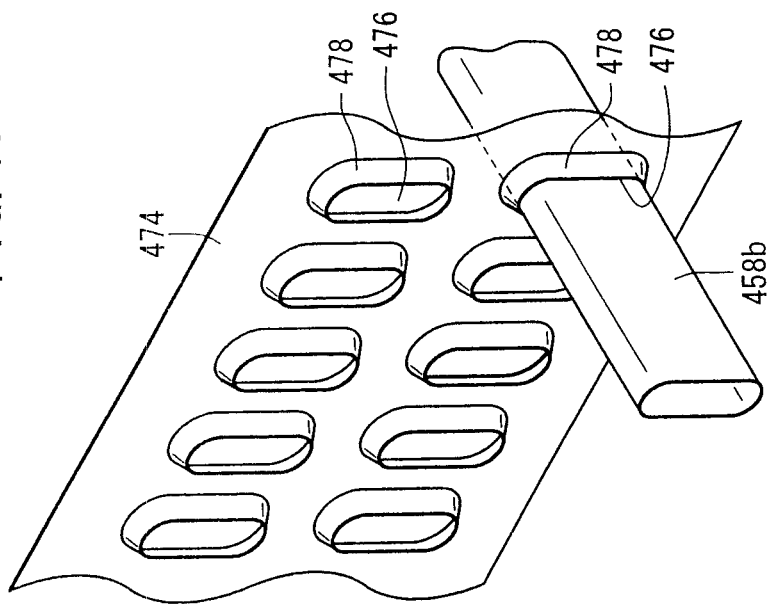
FIG. 19 is an enlarged perspective view showing a condition in which tubes are retained in the partition plate of FIG. 18.

The partition plate 474, as shown in FIGS. 18 and 19, includes a plurality of insertion holes 476 therein through which the tubes 458a, 458b are inserted. Pressing members 478, which are inclined at predetermined angles from the partition plate 474 about centers of the insertion holes 476, are formed in openings of the insertion holes 476. The pressing members 478 are substantially chevron shaped in cross section about the center of the insertion holes 476, and are tiltable with a certain resiliency in a radial direction of the insertion holes about a fulcrum point defined by an adjoining region with the partition plate 474.

Figure 20A:
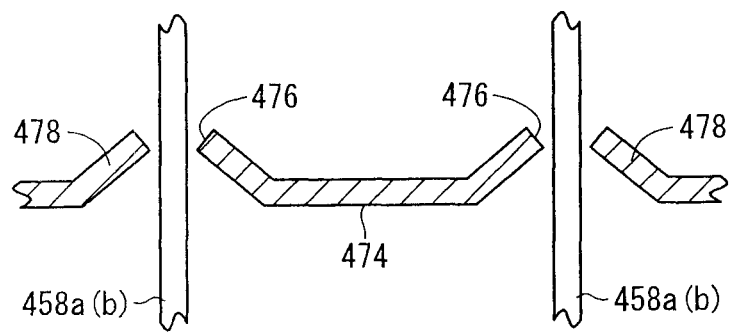
FIG. 20A is a cross sectional view showing, during a manufacturing process for the evaporator, a temporarily assembled state in which tubes are inserted through insertion holes of a partition plate.
Figure 20B:
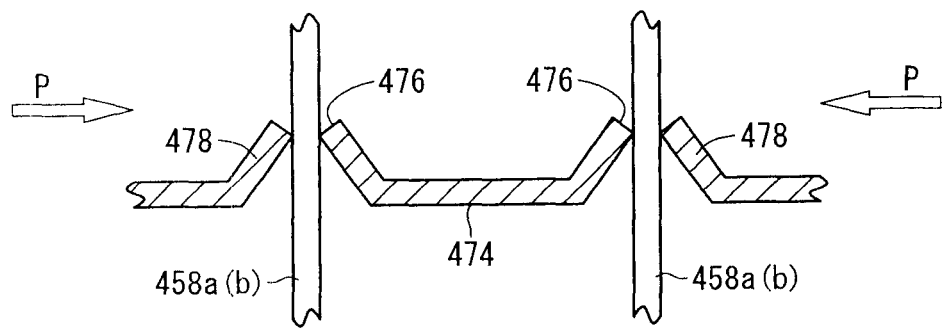
FIG. 20B is a cross sectional view showing, during a manufacturing process for the evaporator, a state in which, from the condition shown in FIG. 20A, the insertion holes are pressed against sides of the tubes to retain the tubes.

In addition, for example, a cut line or seam is disposed in fins 460a forming a boundary between the first cooling section 436 and the second cooling section 438. After the partition plate 474 is inserted between the fins 460a, the tubes 458a, 458b are inserted respectively through the insertion holes 476 of the partition plate 474 (see FIG. 20A). Then, in such a provisionally assembled state, as shown in FIG. 20B, a pressing force P is applied respectively from the right and left in a direction to approach mutually toward the plural tubes 458a, 458b, and while heat is applied thereto, welding (e.g., using solder) is carried out, whereby the tubes 458a, 458b, the fins 460a, and the partition plate 474 are mutually bonded together to manufacture the evaporator 408 (see FIG. 18).

At this time, the pressing members 478 of the partition plate 474 contact the side surfaces of the tubes 458a, 458b due to the pressing force P, and further, because the tubes 458a, 458b are retained by the resilient force thereof, a state in which the partition plate 474 and the tubes 458a, 458b are mutually positioned can be realized. By performing welding in such a positioned state, for example, generation of thermal shrinkage after welding and the occurrence of gaps between the partition plate 474 and the tubes 458a, 458b is prevented.

On the other hand, as shown in FIG. 2, on a downstream side of the evaporator 408, a second front passage 482 is formed, through which air having passed through the first cooling section 436 is supplied. Upwardly of the second front passage 482, a third front passage 484 and a fourth front passage 486 are formed in a branching or bifurcated manner. Further, in the second front passage 482, a first air mixing damper 488 is rotatably disposed so as to face toward the branching portion of the third front passage 484 and the fourth front passage 486.

By rotation of the first air mixing damper 488, the blowing condition and blowing rate of the cooled air that has passed through the evaporator 408 into the third front passage 484 and the fourth front passage 486 is adjusted. The third front passage 484 is arranged in the forward direction (the direction of arrow A), whereas the fourth front passage 486 is arranged in the rearward direction (the direction of arrow B), of the casing 402. The heater core 410 is disposed on a downstream side of the fourth front passage 486.

Upstream of the third front passage 484, a cooling vent damper 490 is disposed in a downward direction facing the second front passage 482, for switching a communication state between the second front passage 482 and the third front passage 484. More specifically, because the cooling vent damper 490 is arranged in the vicinity of the evaporator 408, the cooling vent damper 490 is disposed such that, under a switching action thereof, chilled air cooled by the evaporator 408 is supplied directly into the third front passage 484.

Further, the third front passage 484 extends upwardly, and a first vent blow-out port 492 opens at an upper portion on the downstream side thereof, where a vent damper 494 is rotatably disposed. The vent damper 494 switches a blowing state of air that flows through the third front passage 484, when the air is blown to the first vent blow-out port 492 and a later described sixth front passage 520, and also is capable of adjusting the blowing rate thereof.

The heater core 410 is arranged to straddle between the first divided casing 416 and the second divided casing 418, and is disposed such that one end thereof in the forward direction of the vehicle (the direction of arrow A) is inclined downward at a predetermined angle with respect to the other end thereof in the rearward direction of the vehicle. The heater core 410 includes the first heating section 450 that heats air supplied from the first blower unit 406, and the second heating section 452 that heats air supplied from the second blower unit 412, wherein the first heating section 450 is arranged on the forward side of the casing 402.

Figure 21:
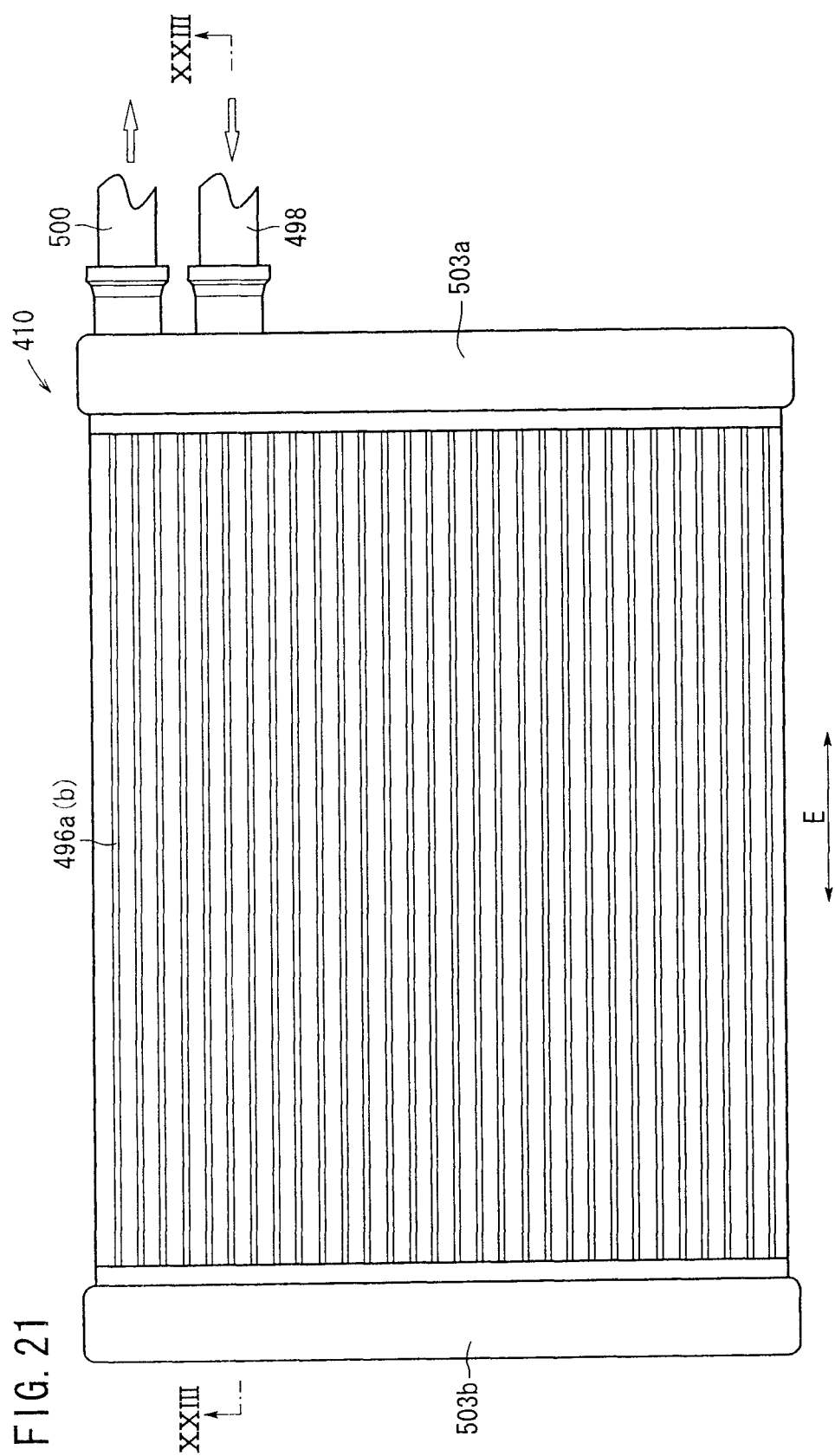
FIG. 21 is a plan view of a heater core.

As shown in FIG. 21, in the heater core 410, tubes 496a, 496b are formed from a pair of thin plates of aluminum or the like, and fins (not shown), which are folded in a serpentine-like undulating shape, are disposed respectively between the stacked tubes 496a, 496b. On the fins, a plurality of louvers are formed, which are cut out so as to be inclined at predetermined angles with respect to planar surfaces of the fins. By causing heated water to flow through the interior of the tubes 496a, 496b, air that passes through the louvers and flows between the fins is heated by the heated water and is supplied to the downstream side as heated air. At the heater core 410, the tubes 496a, 496b are arrayed in parallel and arranged in two layers in the thickness direction of the heater core 410.

Figure 22:
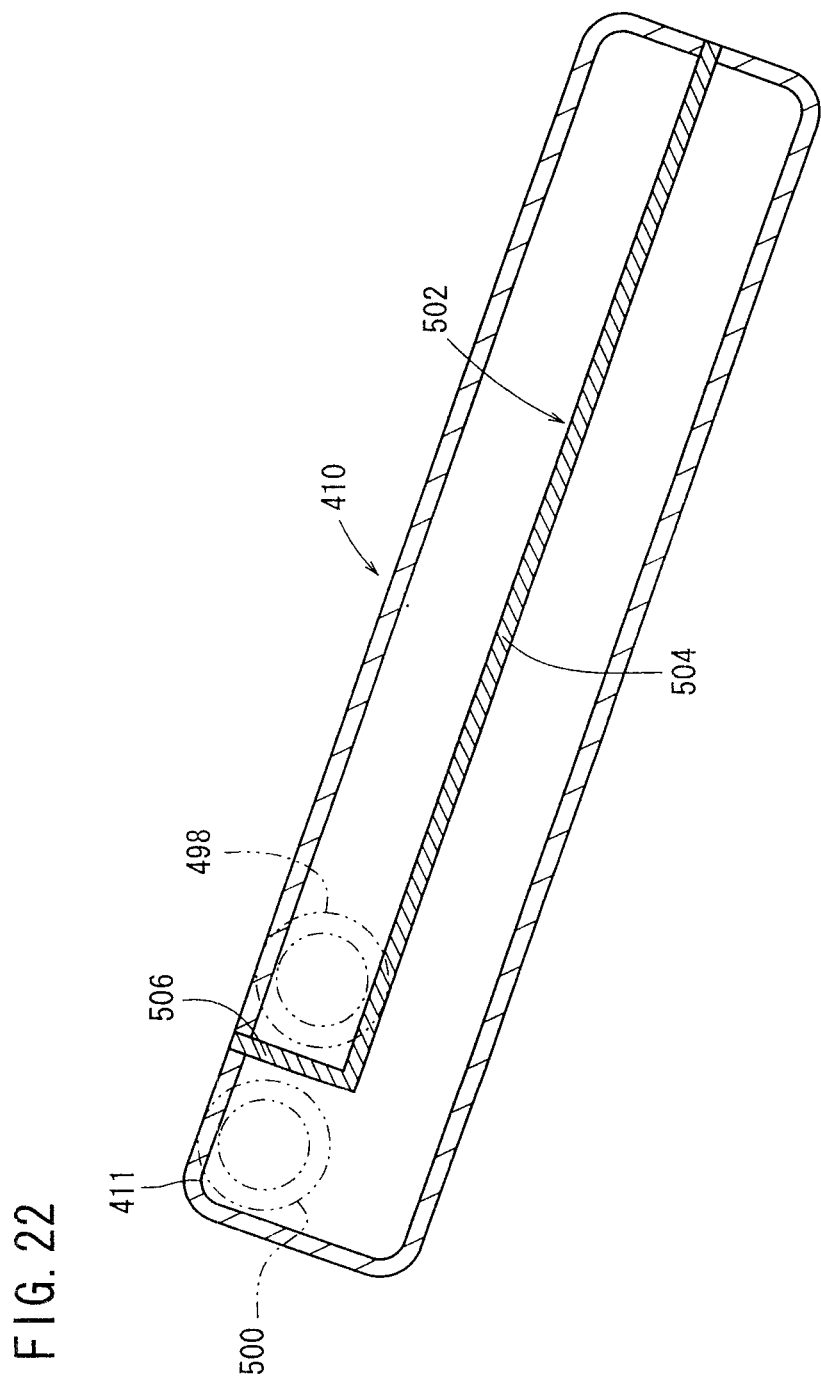
FIG. 22 is a schematic cross sectional view of the heater core shown in FIG. 21.

On both ends of the tubes 496a, 496b, respective hollow tank portions 503a, 503b are connected, which retain the heated water that flows inside the tubes. In addition, as shown in FIGS. 21 and 22, on one of the tank portions 503a on a side surface of the heater core 410, a supply conduit 498 through which heated water is supplied from the exterior, and a discharge conduit 500 through which heated water having circulated through the interior of the heater core 410 is discharged, are connected respectively. The discharge conduit 500 is arranged in the vicinity of a corner portion in a rear upward direction of the casing 402, whereas the supply conduit 498 is arranged in parallel adjacent to the discharge conduit 500.

On the other hand, in the interior of the tank portion 503a, a baffle plate 502 is disposed, which is substantially L-shaped in cross section. The baffle plate 502 extends at a predetermined width in an extending direction (the direction of arrow E) of the supply conduit 498 and the discharge conduit 500, and the baffle plate 502 is arranged between one of the tubes 496a and the other of the tubes 496b. Additionally, as shown in FIG. 23, the pair of tubes 496a, 496b are separated inside the tank portion 503a by the baffle plate 502.

The baffle plate 502, as shown in FIG. 22, is made up from a planar portion 504 arranged centrally in the thickness direction of the heater core 410 and a bent portion 506, which is bent at a right angle at one end of the planar portion 504. The bent portion 506 is disposed between the discharge conduit 500 and the supply conduit 498.

Figure 24A:
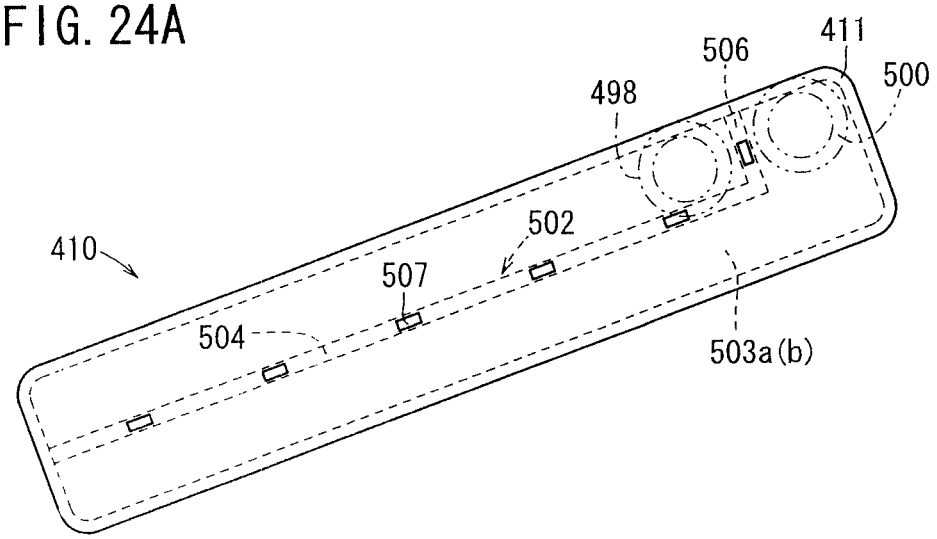
FIG. 24A is a side view of the heater core of FIG. 21.
Figure 24B:
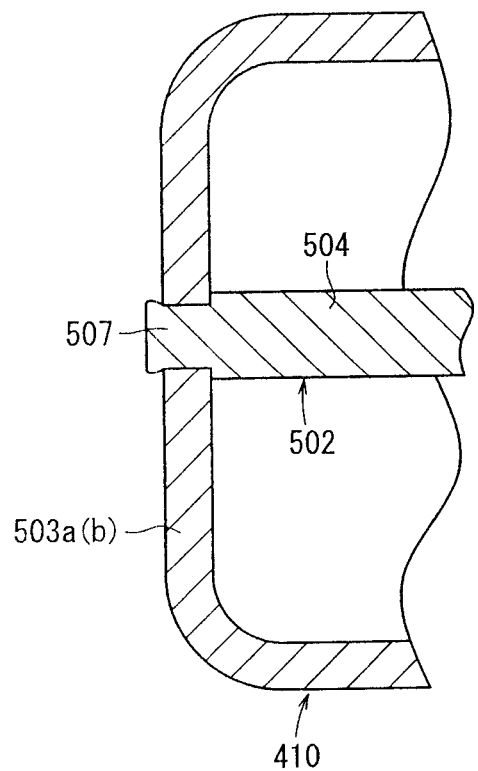
FIG. 24B is an enlarged cross sectional view showing a caulked region of a baffle plate and a housing that make up the heater core.

Further, on the baffle plate 502, a plurality of caulking projections 507 (see FIG. 24A) are disposed respectively on both ends thereof along the longitudinal direction (the direction of arrow E) of the heater core 410. After such caulking projections 507 have been inserted through holes formed in a side surface of the tank portions 503a, 503b to project outwardly therefrom, the projecting regions thereof are pressed and crushed by a non-illustrated jig or the like (see FIG. 24B). Moreover, the caulking projections 507 are formed with rectangular shapes in cross section and are disposed while being mutually separated at predetermined distances on side surfaces of the planar portion 504 and the bent portion 506. Together therewith, holes facing the planar portion 504 are disposed centrally in the thickness direction on the tank portion 503a, and holes facing the bent portion 506 are disposed at positions between the supply conduit 498 and the discharge conduit 500 (see FIG. 24A).

As a result thereof, the baffle plate 502 is affixed securely with respect to the tank portion 503a disposed on the heater core 410.

In addition, heated water supplied from the supply conduit 498 is supplied, via the one tank portion 503a, to one of the tubes 496a, which is disposed on the upper side. Then, after the heated water has flowed through the tube 496a to the other end side of the heater core 410, the heated water reverses direction inside the tank portion 503b disposed at the other end of the heater core 410, passes through the other tube 496b disposed on the lower side, and flows along the lower surface side of the baffle plate 502 back to the one end side of the heater core 410, whereupon the heated water is discharged from the discharge conduit 500.

At this time, since the discharge conduit 500 is connected at an upper corner portion 411 (in the rearward direction) of the heater core 410, which is inclined at a predetermined angle, even in the case that entrapped or retained air is generated inside the heater core 410, the air can be reliably discharged to the exterior through the discharge conduit 500, which is connected at the upper corner portion 411 where such retained air is generated. Stated otherwise, the discharge conduit 500 is connected at an uppermost position in the heater core 410, the heater core 410 being disposed at a predetermined angle of inclination inside the casing 402.

Further, the baffle plate 502, which is disposed inside the heater core 410, is not limited to having an L-shape in cross section, as described above. For example, as shown in FIG. 25, a baffle plate 508 having a cross-like shape in cross section in a heater core 410a may also be used.

Figure 25:
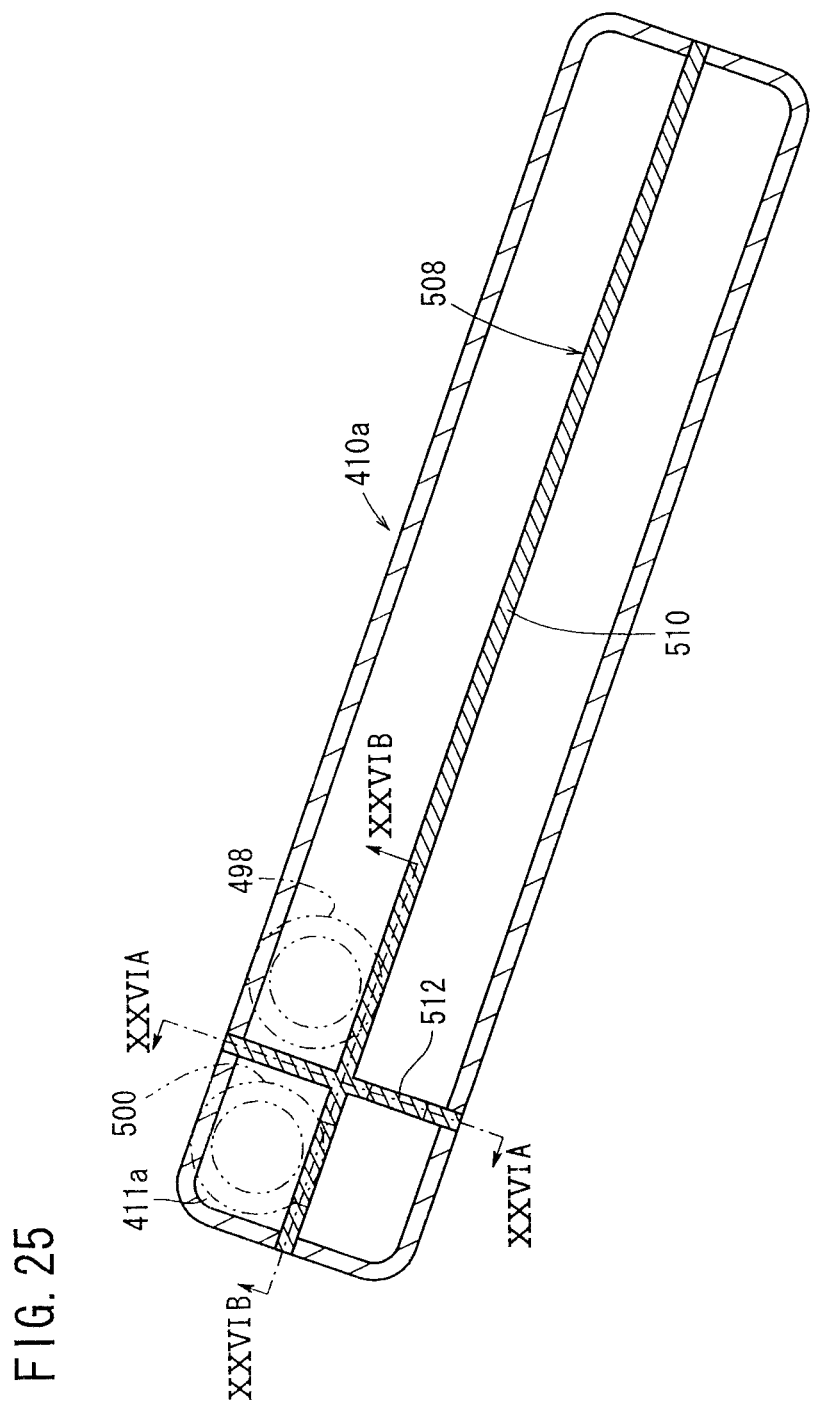
FIG. 25 is a schematic cross sectional view of a heater core according to a modified example in which a cross sectional cross-shaped baffle plate is utilized.

As shown in FIG. 25, the baffle plate 508 includes a planar portion 510 and a vertical portion 512 that intersects at a right angle with respect to the planar portion 510. The planar portion 510 is arranged centrally in the thickness direction of the heater core 410a, and the vertical portion 512 is arranged between the discharge conduit 500 and the supply conduit 498.

Figure 26A:
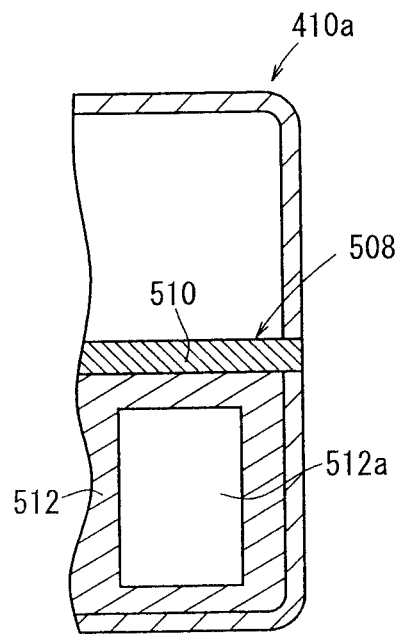
FIG. 26A is a cross sectional view taken along line XXVIA-XXVIA of FIG. 25.
Figure 26B:
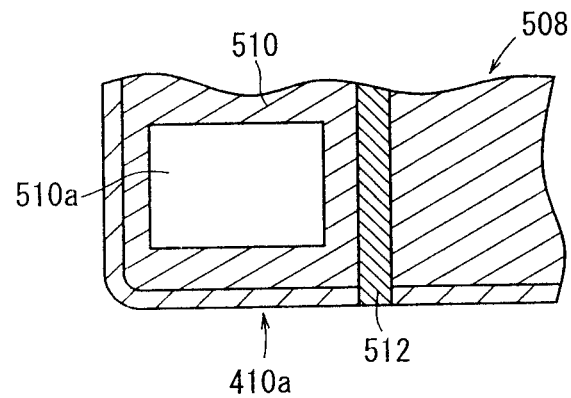
FIG. 26B is a cross sectional view taken along line XXVIB-XXVIB of FIG. 25.

Further, as shown in FIG. 26A, on the vertical portion 512, on the lower surface side of the heater core 410a, a through hole 512a opens through which the circulated heated water can flow. Furthermore, as shown in FIG. 26B, on the planar portion 510 facing the discharge conduit 500, another through hole 510a opens through which the heated water can flow. Additionally, in the heater core 410a employing the baffle plate 508, heated water supplied from the supply conduit 498 is supplied to the interior of one of the tank portions 503a, and flows along an upper surface side of the baffle plate 508 and is supplied to one of the tubes (not shown). Additionally, after reversing in direction at the tank portion 503b disposed on the other end side of the heater core 410a, the heated water flows along the lower surface side of the baffle plate 508, and after flowing to the through hole 510a of the planar portion 510 from the through hole 512a of the vertical portion 512, the heated water is discharged from the discharge conduit 500 via the tank portion 503a.

At this time as well, since the discharge conduit 500 is connected at an upper corner portion 411a (in the rearward direction) of the heater core 410a, which is inclined at a predetermined angle, even in the case that entrapped or retained air is generated inside the heater core 410a, the air can be reliably discharged to the exterior through the discharge conduit 500, which is connected at the upper corner portion 411a where such retained air is generated.

As shown in FIG. 3, on the downstream side of the heater core 410, a fifth front passage 514 is formed. The fifth front passage 514 extends in the forward direction (in the direction of arrow A), and at a location that merges with the third front passage 484, a temperature control damper 516 is provided, and together therewith, sub-defroster dampers 518a, 518b are disposed in an upward direction facing the heater core 410. Under a rotating action of the temperature control damper 516, a communication state between the fifth front passage 514 and the third front passage 484 is switched, for deflecting the blowing direction of warm air supplied from the fifth front passage 514 into the third front passage 484.

On the other hand, the sub-defroster dampers 518a, 518b are disposed so as to be capable of switching a communication state between the fifth front passage 514 and the sixth front passage 520 formed thereabove. By rotating the sub-defroster dampers 518a, 518b and thereby establishing communication between the fifth front passage 514 and the sixth front passage 520, i.e., by shortening the fluid passage from the fifth front passage 514 to the sixth front passage 520, warm air heated by the heater core 410 can be supplied directly to the sixth front passage 520 without flowing through the third front passage 484, in a state in which ventilation resistance of the fluid passage is reduced.

Owing thereto, in the case that a heat mode for blowing air in the vicinity of the feet of passengers, or a defroster mode for blowing air in the vicinity of the front window of the vehicle, is selected, the blowing rate can be increased to quickly heat such areas.

Stated otherwise, even without increasing the rotation of the first blower unit 406, the blowing rate of air during the heat mode and the defroster mode can be increased.

The sixth front passage 520 communicates with the downstream side of the third front passage 484 through the forwardly disposed opening, and communicates with a later-described seventh front passage 522 through the rearwardly disposed opening. A defroster blow-out port 524 opens upwardly of the sixth front passage 520, with a pair of defroster dampers 526a, 526b being disposed rotatably therein facing the defroster blow-out port 524.

The defroster dampers 526a, 526b are provided to switch the blowing state when the air supplied to the sixth front passage 520 is blown out from the defroster blow-out port 524, and further are capable of adjusting the blowing rate thereof.

Further, at a downstream side of the sixth front passage 520, a pair of heat dampers 528 made up from a butterfly valve are rotatably disposed (see FIG. 2). By rotating the heat dampers 528, the blowing state of air is switched, when air supplied from the sixth front passage 520 is blown out through later-described seventh and eighth front passages 522, 540 or through the defroster blow-out port 524, and further, the blowing rate of such air can be adjusted.

Figure 27:
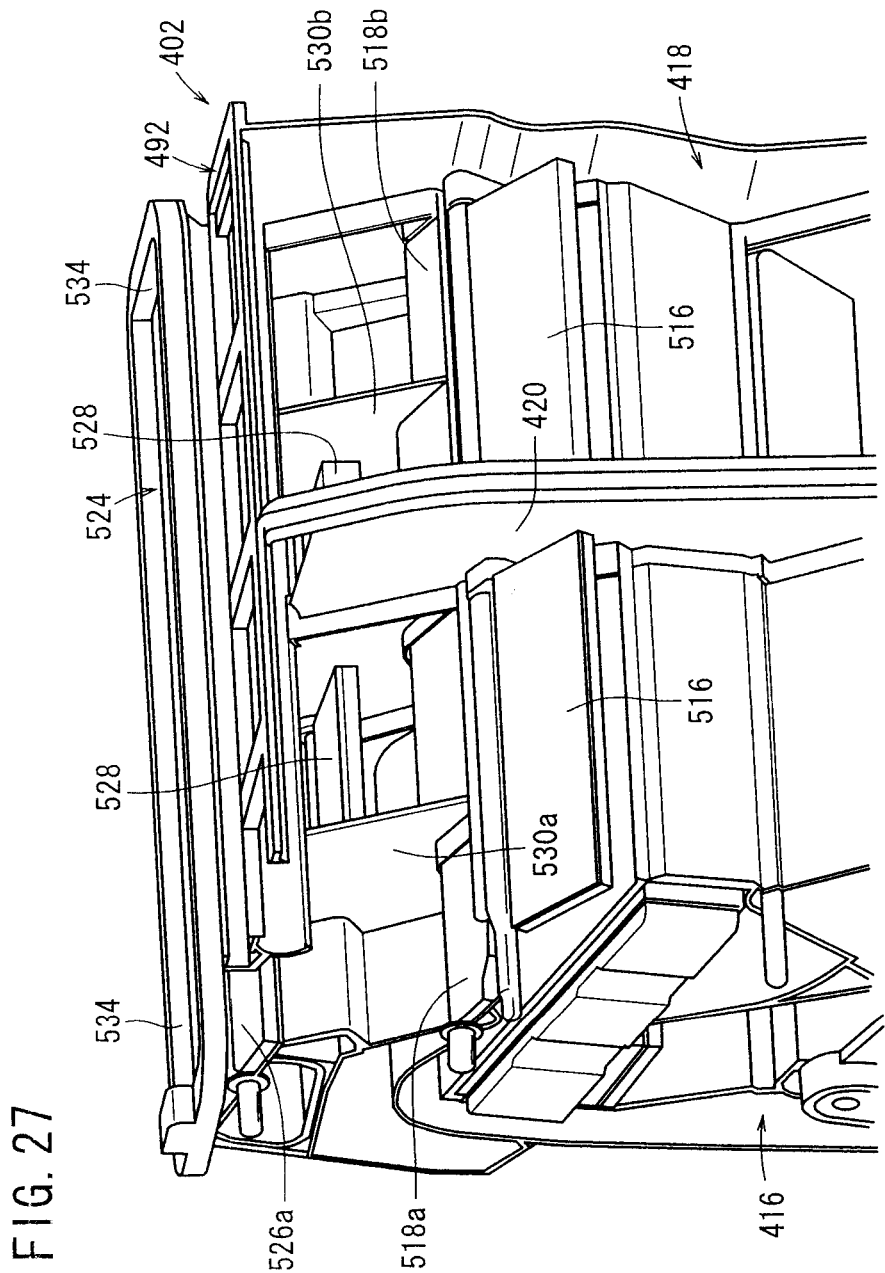
FIG. 27 is a partial cutaway perspective view showing a center plate and a dividing panel disposed inside the casing.

Further, as shown in FIG. 27, the sixth front passage 520 is divided into two sections by the center plate 420, which is disposed centrally in the casing 402 in the widthwise direction thereof. Also, the sixth front passage 520 is further divided respectively by a pair of dividing panels 530a, 530b, which are disposed roughly centrally in the widthwise direction, respectively, of the first and second divided casings 416, 418. In addition, in the sixth front passage 520, between the center plate 420 and the dividing panels 530a, 530b, the pair of heat dampers 528 are disposed, such that air that flows between the center plate 420 and the dividing panels 530a, 530b is directed outwardly to a first heat passage 538 (discussed later) under rotating actions of the heat dampers 528.

On the other hand, the defroster dampers 526a, 526b are disposed respectively between the dividing panels 530a, 530b and inner wall surfaces of the first and second divided casings 416, 418, so that air that flows between the dividing panels 530a, 530b and inner wall surfaces of the first and second divided casings 416, 418 is directed outwardly, respectively, from side portions 534 of the defroster blow-out port 524 under rotating actions of the defroster dampers 526a, 526b.

More specifically, the sixth front passage 520 is divided into four sections inside the casing 402 by the pair of dividing panels 530a, 530b and the center plate 420, such that the blowing state and blowing rate of air that is blown from the defroster blow-out port 524 is switched by the defroster dampers 526a, 526b.

Figure 28:
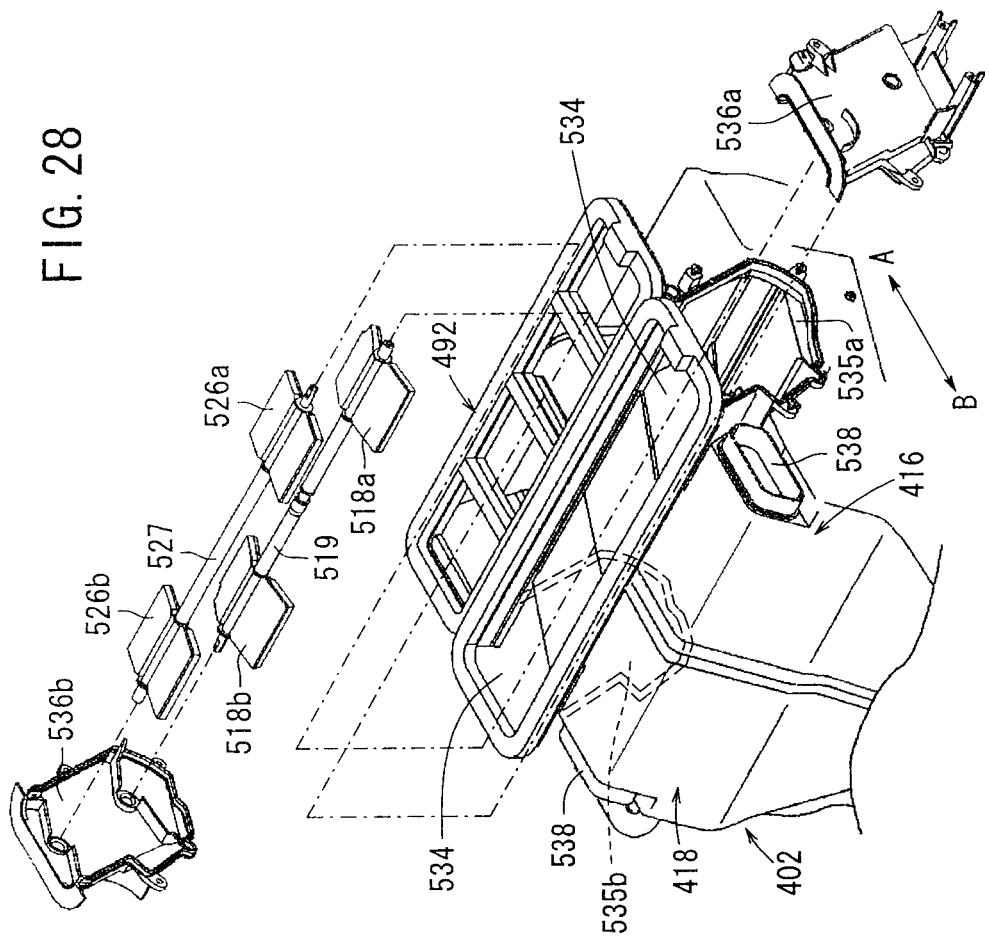
FIG. 28 is an exploded perspective view showing a condition in which a cover is removed from the first and second divided casings, and a defroster damper and a sub-defroster damper are taken out therefrom.

As shown in FIG. 28, by respectively removing covers 536a, 536b, which are disposed alongside the defroster dampers 526a, 526b and the sub-defroster dampers 518a, 518b in the first and second divided casings 416, 418, maintenance thereon, such as exchanging and adjustment of rotation angles, etc., can easily be carried out on the defroster dampers 526a, 526b and the sub-defroster dampers 518a, 518b.

The seventh front passage 522 communicates with a first heat blow-out port (not shown) through the first heat passage 538 for the purpose of blowing air in the vicinity of the feet of passengers in the front seats in the vehicle compartment. The eighth front passage 540 extends downwardly in a curving manner and communicates with a second heat blow-cut port (not shown) upwardly of the second blower unit 412 through a second heat passage (not shown) for the purpose of blowing air in the vicinity of the feet of passengers in the middle seats in the vehicle compartment.

In the casing 402, the first vent blow-out port 492 and the defroster blow-out port 524 open upwardly of the casing 402, and further, the first vent blow-out port 492 is arranged on a forward side (in the direction of arrow A), whereas the defroster blow-out port 524 is arranged rearwardly, substantially centrally in the casing 402 with respect to the first vent blow-out port 492 (see FIG. 3).

Figure 29:
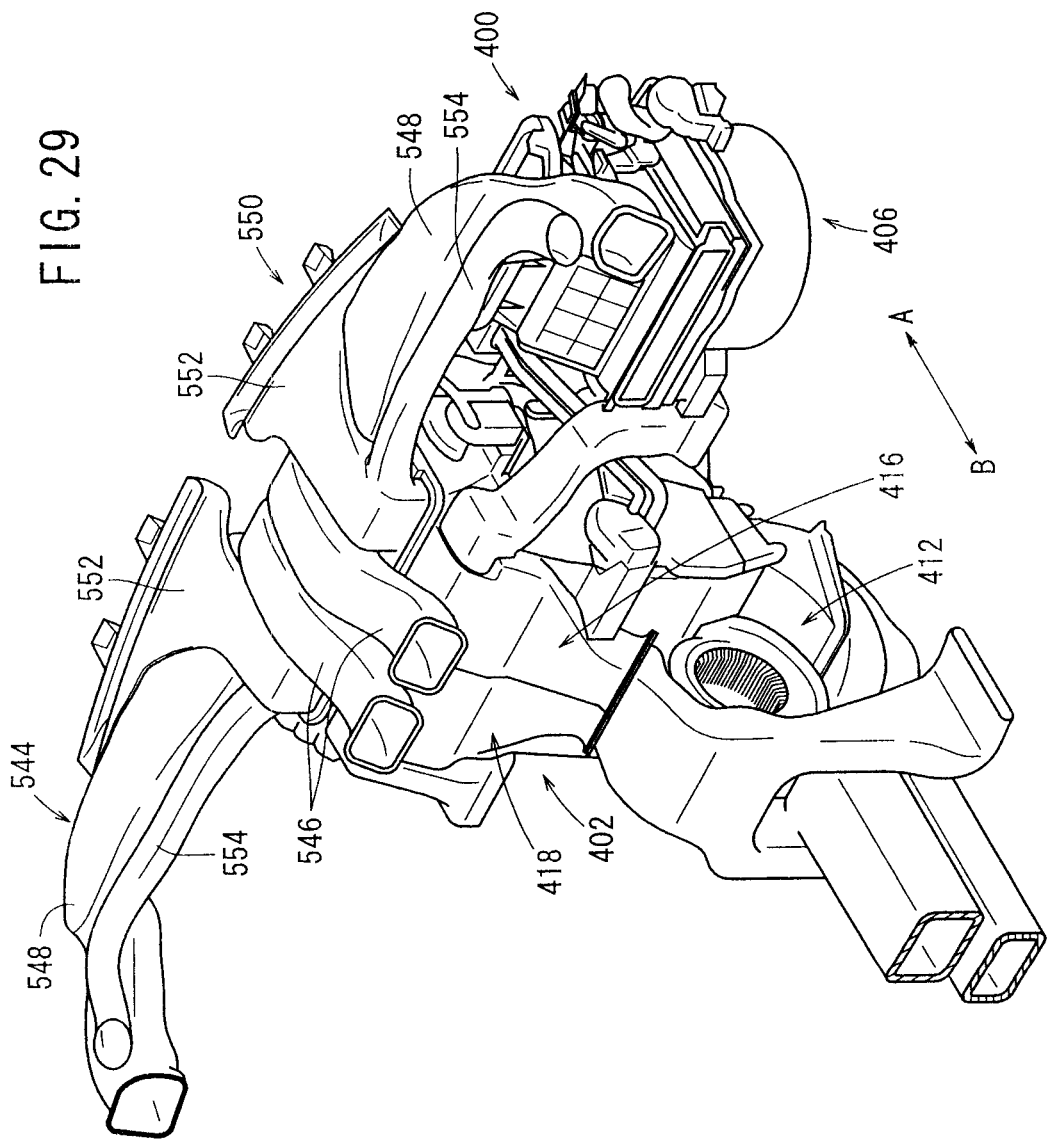
FIG. 29 is a schematic perspective view of the vehicular air conditioning apparatus showing a condition thereof in which a vent duct and a defroster duct are connected respectively to a first vent blow-out port and a defroster blow-out port.
Figure 30:
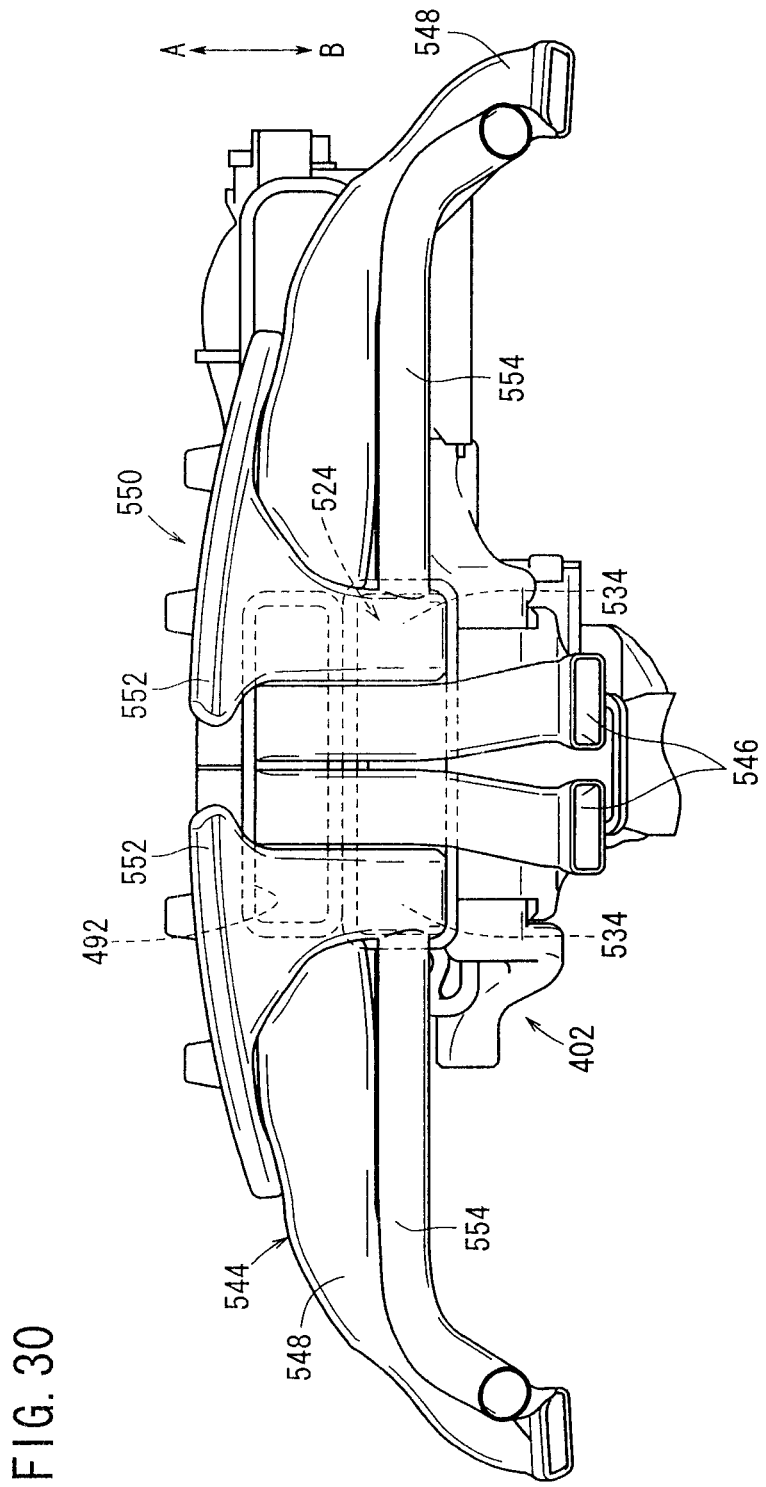
FIG. 30 is a plan view showing the vehicular air conditioning apparatus of FIG. 29.

As shown in FIGS. 29 and 30, a vent duct 544, which extends while curving toward the rearward side of the vehicle (in the direction of arrow B), is connected to the first vent blow-out port 492 for supplying mixed air to the vicinity of faces of passengers in the front seats of the vehicle compartment from the first vent blow-out port 492. A pair of center vent ducts 546 that make up the vent duct 544 are connected to a center portion of the first vent blow-out port 492 and blow air toward the center of the front seats, whereas another pair of side vent ducts 548, which are connected to both ends of the first vent blow-out port 492, extend in lateral directions of the front seats, and blow air toward the driver's seat and passenger seat sides thereof.

On the other hand, a defroster duct 550, which extends while curving toward the forward side of the vehicle (in the direction of arrow A), is connected to the defroster blow-out port 524 for supplying mixed air to the vicinity of the front window in the vehicle compartment from the defroster blow-out port 524. The defroster duct 550 is constituted by center defroster ducts 552, which are branched in a forked manner so as to avoid the center vent ducts 546 that extend upwardly of the defroster blow-out port 524, and extend toward an unillustrated front window, and side defroster ducts 554, which extend perpendicularly to the center defroster ducts 552 in lateral directions together with the side vent ducts 548. As a result, since locations where the respective ducts are accommodated are not increased in volume, the vehicular air conditioning apparatus 400 can be made small in size. Further, the center defroster ducts 552 extend toward the forward side (in the direction of arrow A) straddling upwardly over the side vent ducts 548.

More specifically, the vent duct 544 connects to the first vent blow-out port 492 disposed on the forward side and extends rearwardly (in the direction of arrow B) toward the vehicle compartment, whereas the defroster duct 550 connects to the defroster blow-out port 524 disposed on the rearward side and extends in a forward direction (in the direction of arrow A) on the front window side while crossing over the vent duct 544.

In this manner, by arranging the first vent blow-out port 492 on the forward side of the casing 402, the third front passage 484 that communicates between the downstream side of the evaporator 408 and the first vent blow-out port 492 can be oriented upwardly and arranged in a straight line fashion, while the defroster blow-out port 524 can be disposed upwardly of the heater core 410.

In this case, the center defroster ducts 552 and the side defroster ducts 554 that constitute the defroster duct 550 extend respectively from the side portions 534 of the defroster blow-out port 524, such that the center vent ducts 546 are oriented and can extend rearwardly (in the direction of arrow B) from the first vent blow-out port 492, which is disposed forwardly (in the direction of arrow A) of the defroster blow-out port 524.

The first blower unit 406 includes an intake damper (not shown) in which an external air intake port 556 connected to a duct (not shown) for the purpose of introducing external air and an internal air intake port 558 for introducing internal air are arranged in an opening thereof, and which carries out switching between the external and internal air, and a first blower fan (first blower) 560 that supplies air that is taken in to the interior of the casing 402. A blower case 562 in which the first blower fan 560 is accommodated communicates with the interior of the casing 402 through the connection duct 404 connected to the first intake port 422. Rotation of the first blower fan 560 is controlled by a fan motor (not shown), which is driven under the control of a non-illustrated rotation control device.

On the other hand, in a lower portion of the casing 402, as shown in FIGS. 2 and 3, a second intake port 568 through which air is supplied from the second blower unit 412 is formed at a rearward side perpendicular to the first intake port 422. The second intake port 568 opens at a position on an upstream side of the evaporator 408, and communicates with the first rear passage 570 (second passage), and further, is formed alongside the first intake port 422 via the first rear passage 570 and a first dividing wall 572.

The second blower unit 412 includes a second blower fan (second blower) 574, which supplies air that has been taken in to the interior of the casing 402. A blower case 576 in which the second blower fan 574 is accommodated is connected to the second intake port 568 of the casing 402 and communicates with the first rear passage 570. In the same manner as the first blower fan 560, rotation of the second blower fan 574 is controlled by a fan motor (not shown) driven under the control of an unillustrated rotation control device.

On a downstream side of the first rear passage 570, the evaporator 408 is disposed such that the second cooling section 438 thereof faces the first rear passage 570. The first dividing wall 572, which is formed between the first rear passage 570 and the first front passage 424, extends to the first and second partitioning members 464, 466 that are installed on the evaporator 408. The first partitioning member 464 is retained in the base holder 578, which is disposed at the end of the first dividing wall 572.

More specifically, since the first dividing wall 572 extends to the first and second partitioning members 464, 466 that are installed on the evaporator 408, air that flows to the evaporator 408 through the first rear passage 570 is prevented from mixing with air that flows to the evaporator 408 through the first front passage 424.

Further, a second guide panel 580 for guiding moisture ejected from the evaporator 408 to the bottom of the casing 402 is formed in the first rear passage 570 while being separated a predetermined distance from the first dividing wall 572. An upper end of the second guide panel 580 extends to the vicinity of the base holder 578 disposed on the first dividing wall 572, and is bent rearwardly so as to be separated a predetermined distance from the base holder 578 (see FIG. 7).

In addition, in the event that moisture generated by the second cooling section 438 of the evaporator 408 flows to the forward side (in the direction of arrow A) along the lower surface of the evaporator 408 and is retained in the first partitioning member 464 and the base holder 578, or when such moisture comes into contact with the upper end of the second guide panel 580, the moisture is guided and flows downwardly along the second guide panel 580. The moisture is then discharged from the casing 402 through a second drain port 582 disposed between the first dividing wall 572 and the second guide panel 580. In this case, the upper end of the second guide panel 580 is flexed or bent rearwardly (in the direction of arrow B), so as to be separated a predetermined distance from the base holder 578 (see FIG. 2), whereby the amount of air that reaches the first partitioning member 464 and the base holder 578 is reduced. Consequently, moisture that has accumulated in the first partitioning member 464 and the base holder 578 is prevented from adhering again to the second cooling section 438, while in addition, moisture can be reliably discharged from the second drain port 582.

Owing thereto, condensed water that is generated in the evaporator 408 is prevented from accumulating and freezing in the evaporator 408.

On a downstream side of the evaporator 408, a second rear passage 584 is formed, to which air having passed through the second cooling section 438 of the evaporator 408 is supplied. The second rear passage 584 is separated from the second front passage 482 by a second dividing wall 586, wherein the second partitioning member 466 is retained in the base holder 588 disposed at the end of the second dividing wall 586. Specifically, because the second dividing wall 586 extends to the second partitioning member 466 installed on the evaporator 408, on the downstream side of the evaporator 408 as well, air that flows to the second cooling section 438 of the evaporator 408 through the first rear passage 570 does not intermix with air that passes through the first front passage 424 and flows to the first cooling section 436 of the evaporator 408.

In the second rear passage 584, a second air mixing damper 590 is disposed rotatably therein facing the heater core 410 for mixing cooled air and heated air at a predetermined mixing ratio to thereby produce mixed air. The second air mixing damper 590 switches the communication state between the second rear passage 584 and an upstream or downstream side of a third rear passage 592, which is connected to a downstream side of the heater core 410. Consequently, by rotating the second air mixing damper 590, cool air that is cooled by the evaporator 408 and supplied to the second rear passage 584 and warm air that is heated by the heater core 410 and which flows through the third rear passage 592 are mixed at a predetermined mixing ratio within the third rear passage 592 and blown out therefrom.

Stated otherwise, the third rear passage 592 functions as a mixing section for mixing warm air and cool air, which is then blown out to the middle seats and rear seats in the vehicle.

Figure 31:
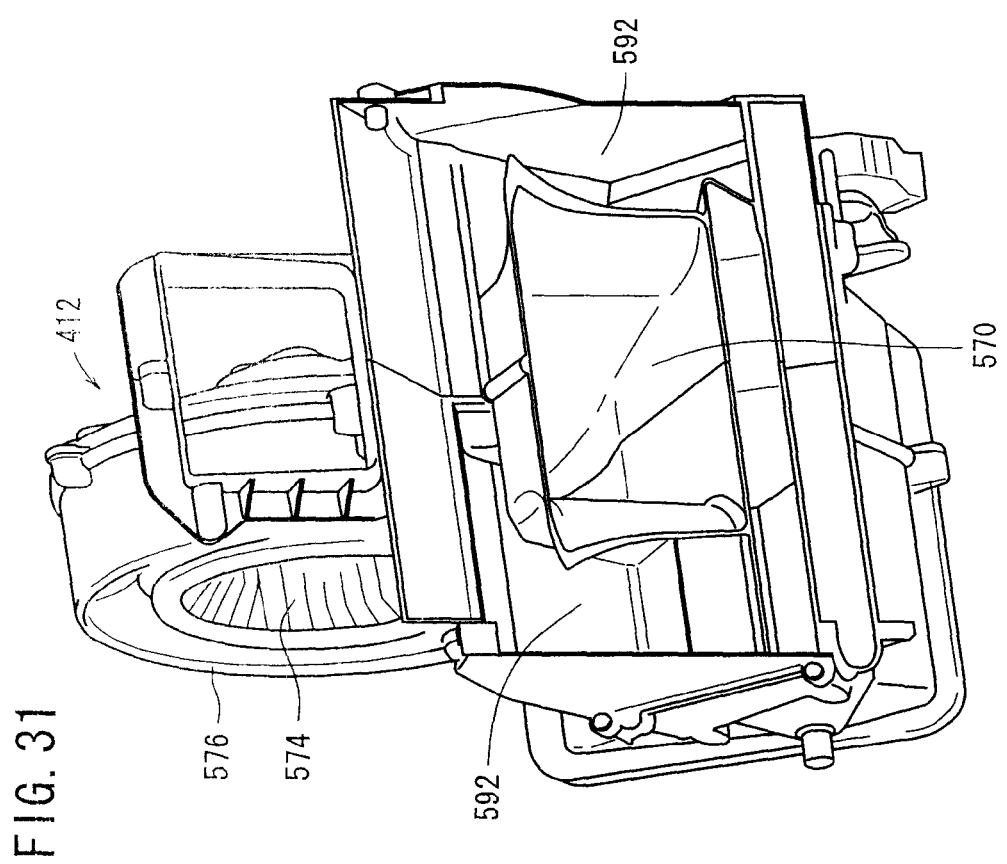
FIG. 31 is an enlarged perspective view showing the vicinity of a first: rear passage and a third rear passage formed in a lower portion of the casing.

Further, as shown in FIG. 2, the third rear passage 592, after bending to circumvent the other end of the heater core 410, extends downwardly, and midway therein, an opening is formed that communicates with the second rear passage 584. On a downstream side extending further downward from the opening, as shown in FIG. 31, the third rear passage 592 branches in a forked manner, branching in widthwise directions of the casing 402 about the first rear passage 570, and after extending so as to avoid the first rear passage 570 on both sides thereof, the third rear passage 592 merges again downward of the first rear passage 570. Stated otherwise, the third rear passage 592 is formed so as to cross over the first rear passage 570.

As shown in FIGS. 2 and 3, on a downstream side of the third rear passage 592, fourth and fifth rear passages 594, 596 communicate therewith. A rotatable mode switching damper 598 is disposed at a branching location thereof, which serves to switch the blowing state of air to the fourth and fifth rear passages 594, 596, which branch respectively from the third rear passage 592, and also to adjust the blowing rate of air thereto.

The fourth and fifth rear passages 594, 596 extend toward a rearward direction of the vehicle. The fourth rear passage 594 communicates with a second vent blow-out port (not shown) for blowing air in the vicinity of faces of passengers in the middle seats of the vehicle. The fifth rear passage 596 communicates with second and third heat blow-out ports (not shown) for blowing air in the vicinity of the feet of passengers in the middle and rear seats.

Specifically, air supplied from the second blower unit 412 is directed into the casing 402 through the second intake port 568, and is selectively supplied to the second vent blow-out port, and the second and third heat blow out ports, which are arranged to face the middle seats and rear seats in the vehicle, through the first through fifth rear passages 570, 584, 592, 594, 596.

Moreover, because the aforementioned second to seventh front passages 482, 484, 486, 514, 520, 522 are divided in half at a substantially central portion of the casing 402 by the center plate 420, the second to seventh front passages 482, 484, 486, 514, 520, 522 are disposed respectively inside of the first and second divided casings 416, 418.

The vehicular air conditioning apparatus 400 according to the embodiment of the present invention is basically constructed as described above. Next, operations and effects of the invention shall be explained.

First, when operation of the vehicular air conditioning apparatus 400 is started, the first blower fan 560 of the first blower unit 406 is rotated under the control of a rotation control device (not shown), and air (interior or exterior air) that is taken in through a duct or the like is supplied to the first front passage 424 of the casing 402 through the connection duct 404. Simultaneously, air (interior air) that is taken in by rotation of the second blower fan 574 of the second blower unit 412 under the control of a non-illustrated rotation control device is supplied to the first rear passage 570 from the blower case 576 while passing through the second intake port 568. In the following descriptions, air supplied to the interior of the casing 402 by the first blower fan 560 shall be referred to as "first air," and air supplied to the interior of the casing 402 by the second blower fan 574 shall be referred to as "second air."

The first air and the second air supplied to the interior of the casing 402 are each cooled by passing respectively through the first and second cooling sections 436, 438 of the evaporator 408, and flow respectively as chilled air to the second front passage 482 and the second rear passage 584, in which the first and second air mixing dampers 488, 590 are disposed. In this case, because the interior of the evaporator 408 is divided into the first cooling section 436 and the second cooling section 438 by a non-illustrated partitioning means, the first air and the second air do not mix with one another.

Herein, in the case that a vent mode is selected by a passenger using a controller (not shown) inside the vehicle compartment for blowing air in the vicinity of the face of the passenger, by blocking communication between the second front passage 482 and the fourth front passage 486 by means of the first air mixing damper 488, the first air (cooled air) flows from the second front passage 482 to the third front passage 484. In this case, the temperature control damper 516 blocks communication between the fifth front passage 514 and the third front passage 484. Additionally, concerning the first air (cooled air) that flows to the third front passage 484, since the vent damper 494 is rotated into a position that blocks communication between the third front passage 484 and the sixth front passage 520, the first air is blown from the open first vent blow-out port 492, through the vent duct 544, and in the vicinity of the face of a passenger who rides in the front seat in the vehicle compartment.

On the other hand, concerning the second air (cooled air), since flow to the second heating section 452 of the heater core 410 is interrupted by the second air mixing damper 590, the second air flows downstream from the second rear passage 584 through the third rear passage 592. Additionally, the second air (cooled air) is blown in the vicinity of the face of a passenger who rides in the middle seat in the vehicle compartment from the second vent blow-out port (not shown) through the fourth rear passage 594 under a switching operation of the mode switching damper 598.

Further, for example, in the vent mode, in the case that the interior of the vehicle compartment is quickly cooled, the cooling vent damper 490 enables communication between the second front passage 482 and the third front passage 484. As a result, since the blowing rate of the first air (cooled air) that flows to the third front passage 484 from the second front passage 482 increases, the vehicle compartment can be cooled quickly by the first air, which is blown from the first vent blow-out port 492 through the vent duct 544.

In this case, since it is unnecessary to mix warm air supplied to the fifth front passage 514 with the cool air of the third front passage 484, the temperature control damper 516 is rotated to become substantially parallel with the third front passage 484 and to block communication between the fifth front passage 514 and the third front passage 484. As a result, cooled air in the third front passage 484 can be supplied to the first vent blow-out port 492 without being raised in temperature. In addition, because the temperature control damper 516 suppresses flow passage resistance when cool air flows through the third front passage 484, low electrical power consumption of the first blower fan 560 is realized, along with reducing noise.

Next, for example, in the case that the bi-level mode is selected by the controller (not shown) inside the vehicle compartment for blowing air in the vicinity of faces and feet of the passengers, the first air mixing damper 488 is rotated to an intermediate position between the third front passage 484 and the fourth front passage 486, so that the first air is caused to flow respectively to both the third front passage 484 and the fourth front passage 486. Furthermore, the temperature control damper 516 is rotated, whereupon air heated by the first heating section 450 of the heater core 410 is supplied into the third front passage 484 from the fifth front passage 514. At this time, the vent damper 494 is positioned at an intermediate position between the first vent blow-out port 492 and the opening of the sixth front passage 520, and together therewith, the defroster blow-out port 524 is blocked by the defroster dampers 526a, 526b, whereupon the communication opening from the fifth front passage 514 to the sixth front passage 520 is blocked by the sub-defroster dampers 518a, 518b and communication therebetween is interrupted.

Herein, the first air (cooled air) flows from the second front passage 482 to the third front passage 484. In this case, the temperature control damper 516 is oriented in a direction so as to be separated from the communication opening between the fifth front passage 514 and the third front passage 484, while the end portion thereof is rotated to face the upstream side of the third front passage 484. Specifically, the first air (cooled air) is heated by the first heating section 450 of the heater core 410, and by mixing only at a small amount with the first air (heated air) that flows to the third front passage 484 through the fifth front passage 514, air is blown directly from the first vent blow-out port 492, through the vent duct 544, and in the vicinity of the face of a passenger who rides in the front seat in the vehicle compartment.

In this case, since the temperature control damper 516 is rotated so that the end portion thereof confronts the upstream side of the third front passage 484 and projects into the third front passage 484, warm air is guided to the upstream side of the third front passage 484 along the temperature control damper 516, and further mixing thereof with cooled air can be promoted. Further, concerning the heat dampers 528 in the form of a butterfly valve, one end side thereof is rotated about the support axis to project toward the side of the sixth front passage 520 (in the direction of arrow A), while the other end side thereof is rotated to project toward the side of the seventh front passage (in the direction of arrow B).

Consequently, warm air that is mixed with cool air in the third front passage 484 flows from the sixth front passage 520, through the seventh front passage 522, and to the first heat passage 538, and is blown in the vicinity of the feet of passengers who ride in the front seat in the vehicle compartment, and together therewith, is blown in the vicinity of the feet of passengers who ride in the middle seats in the vehicle compartment, from the eighth front passage 540 and through the second heat passage (not shown).

Further, the sub-defroster dampers 518a, 518b may be rotated so as to establish communication between the fifth front passage 514 and the sixth front passage 520. As a result, air that passes through the first heating section 450 of the heater core 410 is added to the first air, which has been supplied to the sixth front passage 520 via the third front passage 484, whereupon warm first air can be supplied directly with respect to the sixth front passage 520. Owing thereto, it is possible to decrease ventilation resistance of the fluid passage and to increase the blowing rate of warm air that is blown in the vicinity of the feet of passengers in the front seat in the vehicle compartment from the first heat blow-out port (not shown). Stated otherwise, warm air blown in the vicinity of the feet of passengers can be supplied at a more stable temperature.

On the other hand, concerning the second air (cooled air), the second air mixing damper 590 is rotated to an intermediate position whereby the second air flows to the second heating section 452 of the heater core 410, and together therewith, flows to the third rear passage 592 connected to the second rear passage 584. Specifically, the second air, after having been cooled by the second cooling section 438 of the evaporator 408, is divided in flow by the second air mixing damper 590, such that one portion is guided to the third rear passage 592 as cooled air, whereas the other portion thereof, after being heated by the second heating section 452 of the heater core 410, is blown into the third rear passage 592. As a result, the second air is adjusted to a suitable temperature in the third rear passage 592.

The angle of rotation of the second air mixing damper 590 can be freely changed in accordance with the temperature desired by passengers in the vehicle compartment, or stated otherwise, the second air mixing damper 590 can be rotated in coordination with an input from the controller in the vehicle compartment. Concerning the second air, which flows downstream through the third rear passage 592, the flow rate ratio thereof to the fourth rear passage 594 and the fifth rear passage 596 is adjusted by rotating the mode switching damper 598 to a predetermined position so that the second air flows therethrough. As a result, the second air is blown from the second vent blow-out port (not shown) in the vicinity of the faces of passengers in the middle seats inside the vehicle compartment, or alternatively, is blown from the second heat blow-out port and the third heat blow-out port (not shown) toward the feet of passengers in the middle seats and rear seats inside the vehicle compartment. Herein, the predetermined position of the mode switching damper 598 is defined in accordance with the set temperature and mode, which are input by a passenger from the controller inside the vehicle compartment. The set temperature and/or mode, apart from being input from the front seats, may also be input from the middle seats or the rear seats.

Next, in the case that the heat mode for performing blowing of air in the vicinity of the feet of passengers in the vehicle compartment is selected by the controller (not shown) in the vehicle compartment, compared to the case of the bi-level mode, the first air mixing damper 488 is rotated more to the side of the third front passage 484. Further, the temperature control damper 516 is rotated somewhat to establish communication between the third front passage 484 and the fifth front passage 514. Furthermore, the cooling vent damper 490 blocks communication between the second front passage 482 and the third front passage 484, and the vent damper 494 and the defroster dampers 526a, 526b are rotated respectively so that the first vent blow-out port 492 and the defroster blow-out port 524 are closed.

At this time, similar to the aforementioned bi-level mode, concerning the heat dampers 528 which are formed from a butterfly valve, one end side is rotated about the support axis to project into the sixth front passage 520 (in the direction of arrow A), whereas the other end side is rotated to project into the seventh front passage 522 (in the direction of arrow B).

As a result thereof, the heated first air that has passed through the first heating section 450 of the heater core 410 is supplied to the third front passage 484 from the fifth front passage 514. In the third front passage 484, the first air (cooled air), which has flowed in from the second front passage 482, is mixed with the first air (heated air), whereupon the mixed air passes through the sixth front passage 520 and the seventh front passage 522 and flows rearwardly. In addition, after being supplied to the first heat passage 538, air is blown from a non-illustrated first heat blow-out port in the vicinity of the feet of passengers riding in the front seat in the vehicle compartment, and from the eighth front passage 540 air is blown out via a non-illustrated second heat passage in the vicinity of the feet of passengers in the middle seats in the vehicle compartment.

In this case, since the end of the temperature control damper 516 is rotated toward the upstream side of the third front passage 484 projecting into the third front passage 484, the warm air is guided downstream of the third front passage 484 along the temperature control damper 516, and mixing thereof with the cooled air can be promoted.

Further, the sub-defroster damper 518a, 518b may be rotated to establish communication between the fifth front passage 514 and the sixth front passage 520. In accordance therewith, air passes through the first heating section 450 of the heater core 410 and is added to the first air supplied to the sixth front passage 520 via the third front passage 484, and such heated first air can be supplied directly with respect to the sixth front passage 520. Owing thereto, the air blowing rate of warm air, which is blown in the vicinity of the feet of passengers in the front seat in the vehicle compartment from the first heat blow-out port, can be increased. Stated otherwise, warm air blown in the vicinity of the feet of passengers can be supplied at a more stable temperature.

On the other hand, compared to the case of the bi-level mode, the second air mixing damper 590 is rotated somewhat to separate away from the heater core 410, whereupon second air, which has passed through the second heating section 452 of the heater core 410, flows downstream through the third rear passage 592. By rotating the mode switching damper 598 to a position blocking the fourth rear passage 594, the second air passes through the fifth rear passage 596 and is blown in the vicinity of the feet of passengers in the middle and rear seats in the vehicle compartment from the second heat blow-out port and the third heat flow-out port (not shown).

Next, an explanation shall be made concerning a heat-defroster mode, in which by means of the controller (not shown) in the vehicle compartment, air is blown both in the vicinity of the feet of passengers in the vehicle compartment, and in the vicinity of the front window for eliminating fog (condensation) on the front window.

In the case of the heat-defroster mode, the defroster dampers 526a, 526b in the form of a butterfly valve are rotated about the support axis so as to separate from the defroster blow-out port 524, together with blocking the first vent blow-out port 492 by the vent damper 494 (refer to the broken line in FIG. 3). As a result thereof, a portion of the first air (mixed air) that is mixed in the third front passage 484 passes through the defroster blow-out port 524 and is blown in the vicinity of the front window in the vehicle compartment. Further, another portion of the first air (mixed air) passes through the sixth and seventh front passages 520, 522, and is blown in the vicinity of the feet of passengers in the front seats in the vehicle compartment through the first heat passage 538, as well as being blown in the vicinity of the feet of passengers in the middle seats in the vehicle compartment from the eighth front passage 540 through a non-illustrated second heat passage.

Further, in the heat-defroster mode, in the case that second air is blown toward the middle seats and rear seats of the vehicle compartment, since this mode is the same as the heat mode discussed above, detailed explanations thereof shall be omitted.

Lastly, the defroster mode for blowing air only in the vicinity of the front widow for eliminating fog (condensation) from the front window in the vehicle shall be described. In this case, the first air-mixing damper 488 and the cooling vent damper 490 block communication respectively between the second front passage 482 and the third front passage 484. At the same time, the vent damper 494 blocks the first vent blow-out port 492 and communication between the vent duct 544 and the third front passage 484, while the temperature control damper 516 establishes communication between the fifth front passage 514 and the third front passage 484. Further, the heat dampers 528 in the form of a butterfly valve are rotated about the support axis, so that one end thereof blocks the eighth front passage 540 and the other end thereof blocks the seventh front passage 522, respectively.

On the other hand, the sub-defroster dampers 518a, 518b and the defroster dampers 526a, 526b in the form of butterfly valves are rotated to establish communication between the fifth front passage 514, the sixth front passage 520, and the defroster blow-out port 524. As a result, warm first air that has passed through the heater core 410 is supplied from the fifth front passage 514, through the sixth front passage 520, and to the opened defroster blow-out port 524, whereby warm air is blown in the vicinity of the front window in the vehicle. In this case, the second blower unit 412 is not driven, and only the first air supplied from the first blower unit 406 is blown out.

In the foregoing manner, according to the present embodiment, the sixth front passage 520, which is divided into four sections by the pair of dividing panels 530a, 530b and the center plate 420, is formed inside the casing 402. Also, openings 535a, 535b are provided on the respective sides of the first and second divided casings 416, 418 of the casing 402. The opening 535a is covered with the cover 536a, while the opening 535b is covered with the cover 536b. The pair of covers 536a, 536b rotatably support a pivot shaft 519 for the sub-defroster dampers 518a, 518b in the form of a butterfly valve and a pivot shaft 527 for the defroster dampers 526a, 526b in the form of a butterfly valve. The sub-defroster dampers 518a, 518b are disposed in a passage directly connecting the heater core 410 with the defroster blow-out port 524, and are disposed on an upstream side of the defroster dampers 526a, 526b. Owing thereto, at the downstream side of the sixth front passage 520 that faces the defroster blow-out port 524, the defroster dampers 526a, 526b are disposed. Then, in the casing 402, the sub-defroster dampers 518a, 518b are easily attached downwardly with respect to the defroster dampers 526a, 526b. As a result, the sub-defroster dampers 518a, 518b can be disposed so as to face, for example, the fifth front passage 514 and the sixth front passage 520, which are disposed even inside the casing 402. Thus, the flowing direction and the amount of air can be adjusted freely.

The vehicular air conditioning apparatus according to the present invention is not limited to the above-described embodiment, and it is a matter of course that various modified or additional structures could be adopted without deviating from the essence and gist of the invention as set forth in the appended claims.

What is claimed is:

1. A vehicular air conditioning apparatus including a first blower unit, a second blower unit, a casing in which passages are formed, air from the first and second blower units passing the passages, an evaporator and a heater core disposed inside the casing, wherein the casing comprises:
   a defroster blow-out port that opens at an upper center portion of the casing;
   a vent blow-out port at the upper portion of the casing;
   openings provided on respective sides of the casing;
   cover members covering the openings;
   an air mixing damper;
   a temperature control damper; and
   a vent damper,
   wherein the cover members rotatably support a defroster damper and a sub-defroster damper that open/close the defroster blow-out port,
   the sub-defroster damper is disposed immediately above the heater core and the defroster damper is disposed immediately above the sub-defroster damper such that the sub-defroster damper and the defroster damper form a first air passage and air from the heater core is supplied linearly straight up to the defroster blow-out port through the first air passage,
   the air mixing damper is disposed above the evaporator, the temperature control damper is disposed above the air mixing damper, and the vent damper is disposed above the temperature control damper such that the air mixing damper, the temperature control damper, and the vent damper form a second air passage and air from the evaporator is supplied linearly straight up to the vent blow-out port through the second air passage, and
   the temperature control damper is disposed between the first air passage and the second air passage such that when the temperature control damper closes, the air from the heater core does not enter into the second air passage and when the temperature control damper opens, the air from the heater core enters into the second air passage.

2. The vehicular air conditioning apparatus according to claim 1, wherein at least one of the defroster damper and the sub-defroster damper comprises a butterfly valve.

3. The vehicular air conditioning apparatus according to claim 1, wherein the sub-defroster damper is disposed in a passage directly connecting the heater core or the evaporator with the defroster blow-out port.

4. The vehicular air conditioning apparatus according to claim 2, wherein the sub-defroster damper is disposed in a passage directly connecting the heater core or the evaporator with the defroster blow-out port.

5. The vehicular air conditioning apparatus according to claim 1, wherein the sub-defroster damper is disposed on an upstream side of the defroster damper.

6. The vehicular air conditioning apparatus according to claim 1, wherein the openings comprise a first opening and a second opening that are provided in corresponding positions on the sides of the casing, and
   wherein the cover members comprise a first cover member and a second cover member that cover the first opening and the second opening, respectively.

7. The vehicular air conditioning apparatus according to claim 1, wherein the air mixing damper is disposed on a downstream side of the evaporator and on a upstream side of the heater core, and the air mixing damper adjusts an amount of air that passes through the evaporator and enters into the heater core.

8. The vehicular air conditioning apparatus according to claim 1, wherein the heater core has a lower surface and an upper surface, the heater core heating air by passing air from the lower surface to the upper surface,
   the evaporator has a lower surface and an upper surface, the evaporator cooling air by passing air from the lower surface to the upper surface, and
   the cover members cover the openings and support pivot axes of the sub-defroster damper and the defroster damper such that directions of the pivot axes of the sub-defroster damper and the defroster damper are in parallel with the lower and upper surfaces of the heater core and the lower and upper surfaces of the evaporator.

9. The vehicular air conditioning apparatus according to claim 1, wherein the first blower is attached to the casing by a first intake port and the second blower is attached to the casing by a second intake port, and
   an axis of the first intake port is disposed in perpendicular to an axis of the second intake port.

10. The vehicular air conditioning apparatus according to claim 1, wherein the first blower is attached to the casing by a first intake port and the second blower is attached to the casing by a second intake port,
the evaporator has a lower surface and an upper surface, the evaporator cooling air by passing air from the lower surface to the upper surface, the lower surface having a first cooling section and a second cooling section,
the first intake port is connected to the first cooling section such that the first blower supplies air to the first cooling section,
the second intake port is connected to the second cooling section such that the second blower supplies air to the second cooling section,
an axis of the first intake port is disposed in perpendicular to an axis of the second intake port, and
the cover members support pivot axes of the sub-defroster damper and the defroster damper such that directions of the pivot axes of the sub-defroster damper and the defroster damper are in parallel with a rotation axis of a fan of the second blower.

11. The vehicular air conditioning apparatus according to claim 1, wherein the first blower is attached to the casing by a first intake port and the second blower is attached to the casing by a second intake port,
the evaporator has a lower surface and an upper surface, the evaporator cooling air by passing air from the lower surface to the upper surface, the lower surface having a first cooling section and a second cooling section,
the first intake port is connected to the first cooling section such that the first blower supplies air to the first cooling section,
the second intake port is connected to the second cooling section such that the second blower supplies air to the second cooling section,
an axis of the first intake port is disposed in perpendicular to an axis of the second intake port,
the cover members cover the openings and support pivot axes of the sub-defroster damper and the defroster damper such that directions of the pivot axes of the sub-defroster damper and the defroster damper are in parallel with the lower and upper surfaces of the heater core and the lower and upper surfaces of the evaporator, and
the cover members support the pivot axes of the sub-defroster damper and the defroster damper such that directions of the pivot axes of the sub-defroster damper and the defroster damper are in parallel with a rotation axis of a fan of the second blower.

12. The vehicular air conditioning apparatus according to claim 1, wherein the casing further comprises a rear passage connected to a downstream side of the heater core, the rear passage supplying air from the heater core to rear-side seats in the vehicle,
the first blower is attached to the casing by a first intake port and the second blower is attached to the casing by a second intake port,
an axis of the first intake port is disposed in perpendicular to an axis of the second intake port, and
the rear passage is branched in a forked manner such that the branched rear passages surround the second intake port.

13. The vehicular air conditioning apparatus according to claim 12, wherein a portion of a conduit of the rear passage is a portion of a conduit of the second intake port.

14. A vehicular air conditioning apparatus including a casing, an evaporator and a heater core disposed inside the casing, wherein the casing comprises:
a blow-out port that opens at an upper center portion of the casing;
openings provided on respective sides of the casing; and
cover members covering the openings,
wherein the cover members rotatably support a first damper and a second damper that open/close the blow-out port,
the second damper is disposed immediately above the heater core and the first damper is disposed immediately above the second damper such that air from the heater core is supplied linearly straight up to the blow-out port through the second damper and the first damper,
the evaporator has a lower surface and an upper surface, the evaporator cooling air by passing air from the lower surface to the upper surface,
the heater core has a lower surface and an upper surface, the heater core heating air by passing air from the lower surface to the upper surface,
the cover members cover the openings and support pivot axes of the second damper and the first damper such that directions of the pivot axes of the second damper and the first damper are in parallel with the lower and upper surfaces of the heater core and the lower and upper surfaces of the evaporator,
the vehicular air conditioning apparatus further comprises a first intake port that attaches a first blower to the casing and a second intake port that attaches a second blower to the casing,
the casing further comprises a rear passage connected to a downstream side of the heater core, the rear passage supplying air from the heater core to rear-side seats in the vehicle, and
the rear passage is branched in a forked manner such that the branched rear passages surround the second intake port.

15. The vehicular air conditioning apparatus according to claim 14, wherein the blow-out port is a defroster blow-out port, the first damper is a defroster damper, and the second damper is a sub-defroster damper disposed on an upstream side of the defroster damper.

16. The vehicular air conditioning apparatus according to claim 15, wherein the sub-defroster damper is disposed in a passage directly connecting the heater core or the evaporator with the defroster blow-out port.

17. The vehicular air conditioning apparatus according to claim 14, wherein the openings comprise a first opening and a second opening that are provided in corresponding positions on the sides of the casing, and
wherein the cover members comprise a first cover member and a second cover member that cover the first opening and the second opening, respectively.

18. The vehicular air conditioning apparatus according to claim 15, wherein the heater core is inclined downward at a predetermined angle such that the air from the heater core is supplied linearly straight up to the defroster blow-out port through the sub-defroster damper and the defrosted damper.

19. The vehicular air conditioning apparatus according to claim 14, wherein a portion of a conduit of the rear passage is a portion of a conduit of the second intake port.

* * * * *